(12) United States Patent
Stuart et al.

(10) Patent No.: US 7,377,538 B2
(45) Date of Patent: May 27, 2008

(54) SHOPPING BUDDY

(76) Inventors: Myrna Lea Stuart, 3045-29A Street S.E., Calgary, Alberta (CA) T2B 0S4; Gordon Henry Stuart, 3045-29A Street S.E., Calgary,Alberta (CA) T2B 0S4

( * ) Notice: Subject to any disclaimer, the term of this patent is extended or adjusted under 35 U.S.C. 154(b) by 47 days.

(21) Appl. No.: 10/359,390

(22) Filed: Feb. 7, 2003

(65) Prior Publication Data
US 2006/0097487 A1     May 11, 2006

(51) Int. Cl.
*B62B 3/02* (2006.01)
(52) U.S. Cl. .................... 280/651; 280/79.3
(58) Field of Classification Search ............ 280/639, 280/640, 651, 42, 659, 47.34, 79.11, 79.3, 280/47.35; 16/366, 367, 371
See application file for complete search history.

(56) References Cited

U.S. PATENT DOCUMENTS

| | | | |
|---|---|---|---|
| 546,993 A | 10/1895 | Bigalow | |
| 1,643,268 A | 9/1927 | Burwatt | |
| 2,020,766 A * | 11/1935 | Brown | 280/639 |
| 2,487,706 A | 11/1949 | Happ | |
| 2,615,593 A * | 10/1952 | Wolforth | 220/640 |
| 2,920,900 A | 1/1960 | Best | |
| 3,148,892 A | 9/1964 | Merriott | |
| 3,154,044 A | 10/1964 | Bellas | |
| 3,514,123 A | 5/1970 | Injeski | |
| 3,968,991 A | 7/1976 | Maclaren | |
| 4,185,848 A | 1/1980 | Holtz | |
| 4,339,141 A * | 7/1982 | Thiboutot | 280/652 |
| 4,647,056 A | 3/1987 | Baker | |
| 4,761,012 A | 8/1988 | Dames | |
| 4,765,644 A | 8/1988 | Bell | |
| 4,771,871 A | 9/1988 | Lambracht | |
| 4,795,180 A | 1/1989 | Polcyn | |
| 4,878,682 A * | 11/1989 | Lee | 280/42 |
| 4,889,352 A | 12/1989 | Chamberlin, Jr. et al. | |
| 4,989,749 A * | 2/1991 | Choi | 280/47.34 |
| 5,213,447 A | 5/1993 | Srock | |
| 5,485,655 A * | 1/1996 | Wang | 16/371 |
| 5,806,864 A * | 9/1998 | Zielinski et al. | 280/42 |
| 5,915,723 A * | 6/1999 | Austin | 280/651 |
| 6,354,619 B1* | 3/2002 | Kim | 280/651 |
| 6,685,199 B2* | 2/2004 | Stravitz et al. | 280/42 |

* cited by examiner

*Primary Examiner*—Frank Vanaman
(74) *Attorney, Agent, or Firm*—Sean W. Goodwin; Linda M. Thompson

(57) ABSTRACT

A portable folding shopping cart and utility carrier has a folding frame and a flexible basket and bottom shelf which can be folded to a compact size and shape for storage when not in us and can be readily unfolded for use. Wheels permit the cart to be easily transported. The basket and shelf are capable of carrying loads of about seventy-five pounds and fifty pounds, respectively.

21 Claims, 21 Drawing Sheets

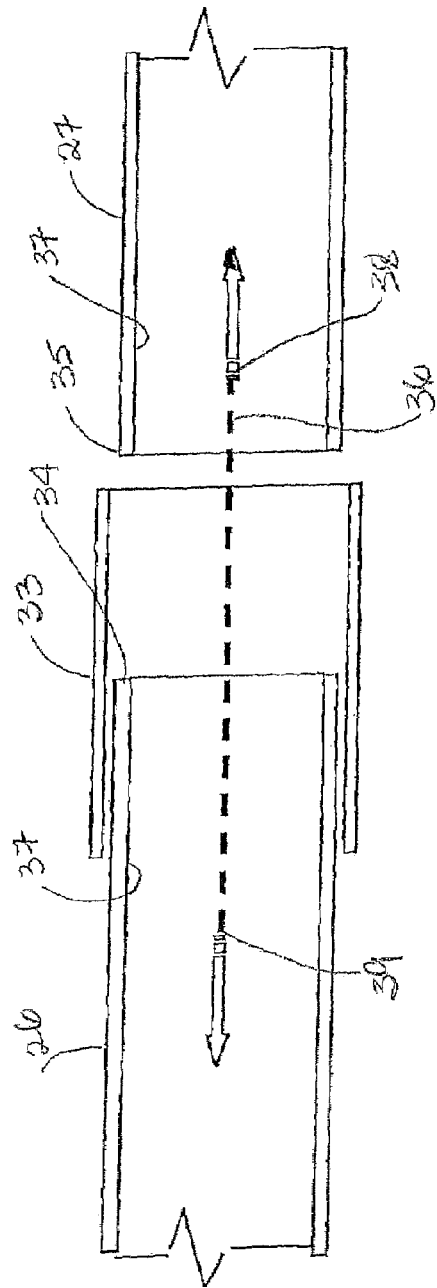
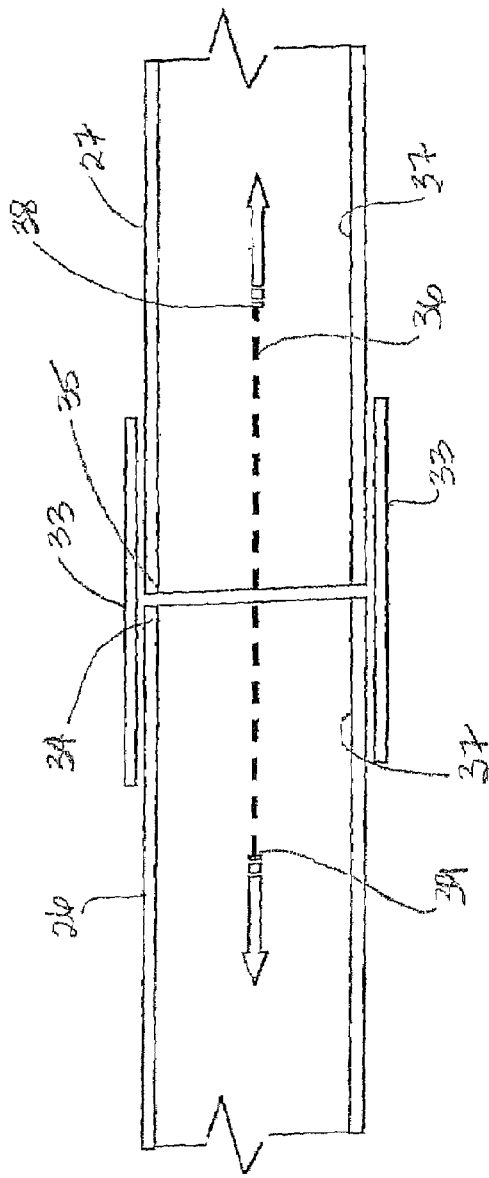

SHOPPING BUDDY

FIELD OF THE INVENTION

The present invention relates to the field of shopping and utility carts. More particularly, the present invention relates to a portable folding shopping cart and utility carrier.

BACKGROUND OF THE INVENTION

In general, there are many types of shopping carts, utility carriers and the like in today's market. Some devices are used for carrying purchases, such as when shopping, some for transporting small items such as books and others are used for transporting clothing and the like from place to place.

Shopping carts are typically used, such as in supermarkets, to transport groceries or other objects around the store and to a vehicle for transport to a final destination. Conventionally, shoppers carry the articles from the vehicle to the residence however this requires a certain amount of strength and can be very time consuming and tiring, particularly if the distances are great or there are a number of articles to be transported.

Further, in the absence of a vehicle, carts may be used to transport articles from one location to another, such as purchases from a shopping trip to a residence, laundry to a laundromat and from one place to another within the home or office.

When the cart is not in use it must be stored, which can be problematic, particularly if space is limited. It is known to provide folding carts which can be collapsed when not in use for storage and which can be readily transported in their folded state, such as in a vehicle, for use wherever desired.

There is interest in a multi-purpose portable cart which could be quickly and easily deployed for use and folded for storage, would be relatively lightweight, large enough to carry a significant number of articles and would be sturdy enough to carry a significant amount of weight.

SUMMARY OF THE INVENTION

A portable folding shopping cart and utility carrier comprises a frame which can be collapsed to a compact folded position for storage when not in use and an open position for use in carrying a variety of loads in an top flexible basket and on a bottom shelf. A tensile connector is connected between the basket and the shelf to support the basket and shelf in spaced relationship when in use, for assisting in folding the shelf and the lower platform portion of the frame during folding of the cart and for ensuring the folded basket and shelf remain in a space defined by the frame, when folded.

In a broad aspect, a portable folding shopping cart and utility carrier comprising: a foldable substantially rectangular frame having, four substantially vertical members; a substantially rectangular upper horizontal platform having end and side members, each of the end and side members comprising two components, the upper platform being hingedly connected to the vertical members adjacent a top end of the vertical members; a substantially rectangular lower horizontal platform having end and side members, each of the end and side members comprising two components, the lower platform being hingedly connected to the vertical members adjacent a lower end of the vertical members; wherein the two components of each of the end and side members of the upper and lower platforms are foldable between each of the two components between a substantially aligned open position and a folded position; a flexible top basket, having a peripheral upper edge, closed ends, sides and a bottom and an open top, supported at the upper edge by the upper platform, the top basket being foldable into a space defined by the substantially rectangular frame in the folded position; a flexible lower shelf having a peripheral edge supported by the lower platform and being foldable in the space defined by the substantially rectangular frame in the folded position; a plurality of wheels connected to bottoms of the vertical members; and a tensile connector connected between a bottom of the top basket and the a top of lower shelf for supporting the top basket and lower shelf in spaced relationship in the open position, for retaining the top basket and the lower shelf within the space defined by the rectangular frame in the folded position and for assisting in folding the lower shelf when the top basket is in a folded position.

In one embodiment, the upper and lower platform are formed having two components on each of the sides and ends connected therebetween by a swivel hinge which permits the two components, forming ends and sides of the upper platform, to fold downwards and the two components, forming ends and sides of the lower platform, to fold upwards. Friction hinges connect the ends and side members of each of the upper and lower platforms to the vertical members and permit folding at the vertical members.

The friction hinges and lower swivel hinges have friction means incorporated therein to aid in locking the cart in the open position to permit voluntary folding when loaded. The upper swivel hinges have a tensile member incorporated therein for maintaining the two components of each of the side and end members in an aligned horizontal position when the cart is unfolded.

BRIEF DESCRIPTION OF THE DRAWINGS

FIG. 2A is a side view according to FIG. 1;

FIG. 2B is a front view according to FIG. 1;

FIG. 2C is a back view according to FIG. 1, the handles having been removed for clarity;

FIG. 2D is a plan view according to FIG. 1; and

FIG. 2E is a bottom view according to FIG. 1

FIG. 3A is a side view according to FIG. 1, illustrating the cart in a partially folded position;

FIG. 3B is a front view according to FIG. 3A;

FIG. 3C is a side view according to FIG. 1 in the folded position; and

FIG. 3D is a front view according to FIG. 1 in the folded position;

FIG. 4A is a schematic side view in the partially folded position according to FIG. 3A;

FIG. 4B is a schematic front view in the partially folded position according to FIG. 3B;

FIG. 4C is a schematic front view in the folded position according to FIG. 3D; and FIG. 4D is a schematic side view in the folded position according to FIG. 3C;

FIGS. 5A-5C are partial sectional views of an upper swivel hinge for connecting components of an upper platform so as to permit downwards folding of the upper platform components, more particularly FIG. 5A is a longitudinal partial sectional view illustrating the top platform components and a swivel hinge in a locked, unfolded position;

FIG. 5B a longitudinal partial sectional view illustrating the top platform components and the swivel hinge in an unlocked position for folding; and FIG. 5C a longitudinal partial sectional view illustrating the top platform components and the swivel hinge in the folded position;

FIG. 6B a longitudinal partial sectional view illustrating the lower platform components and the swivel hinge in the folded position;

FIG. 6C is a partial sectional end view of the lower platform components and the swivel hinge in the unfolded position; and FIG. 6D is a partial sectional end view of the lower platform components and the swivel hinge in the folded position FIG. 7A is an isometric view of the friction hinge connected to a vertical member;

FIG. 7B is a plan view of the friction hinge, platform components and vertical member in the folded position;

FIG. 7C is a plan view of the friction hinge, platform components and vertical member in the unfolded position;

FIG. 7D is a side view of the friction hinge, platform components and vertical member in the folded position; and FIG. 7E is a side view of the friction hinge, platform components and vertical member in the unfolded position;

FIG. 8A is an isometric view of the top basket; and FIG. 8B is an isometric view of the bottom shelf; FIG. 9A is an isometric view of the top basket; and FIG. 9B is an isometric view of the bottom shelf.

DETAILED DESCRIPTION OF THE PREFERRED EMBODIMENT

Figure 1:
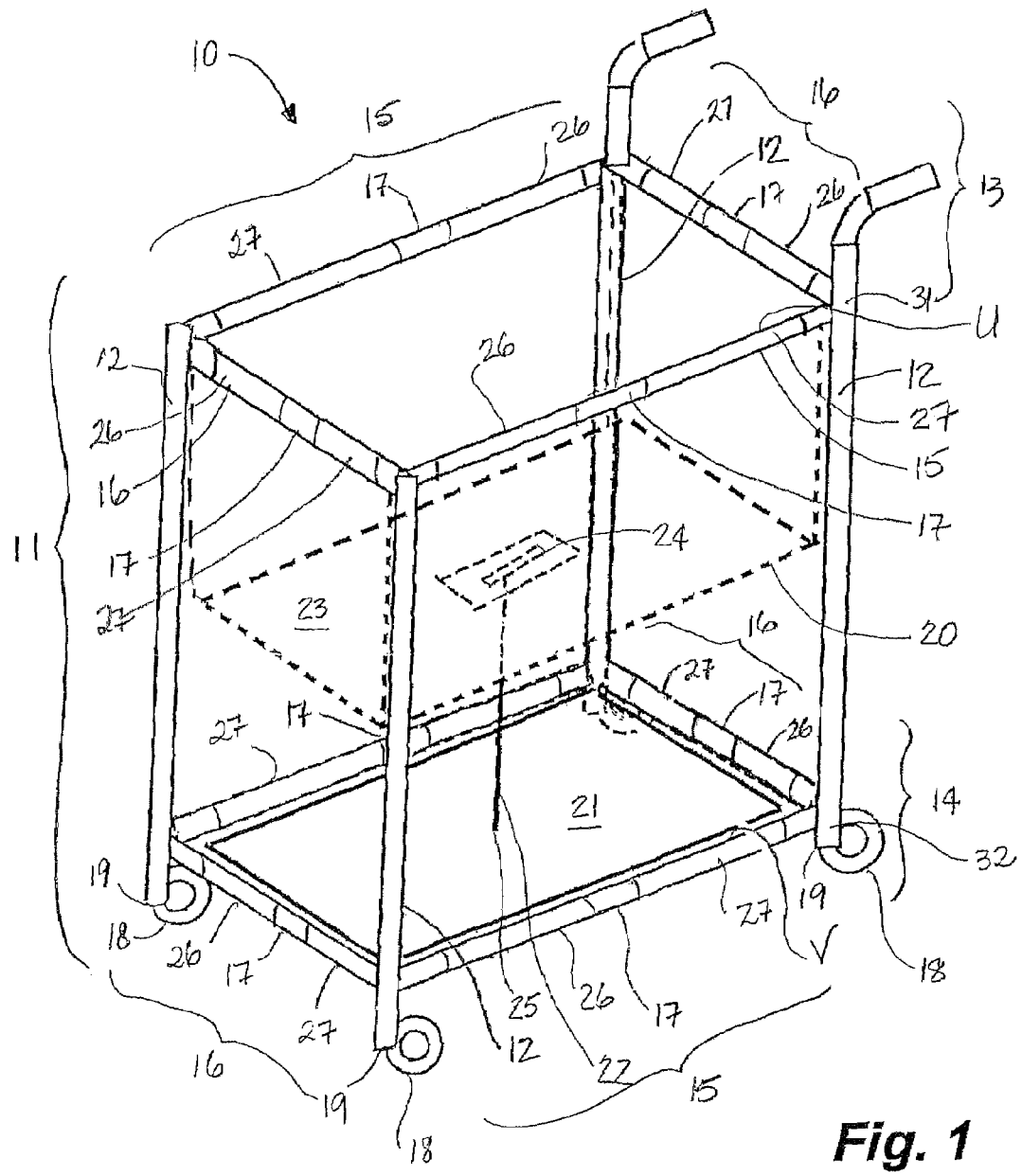
FIG. 1 is a perspective view of an embodiment of the invention in an open usable position (unfolded condition), a top basket and bottom shelf shown in dashed lines for clarity of a frame structure.
Figure 2A:
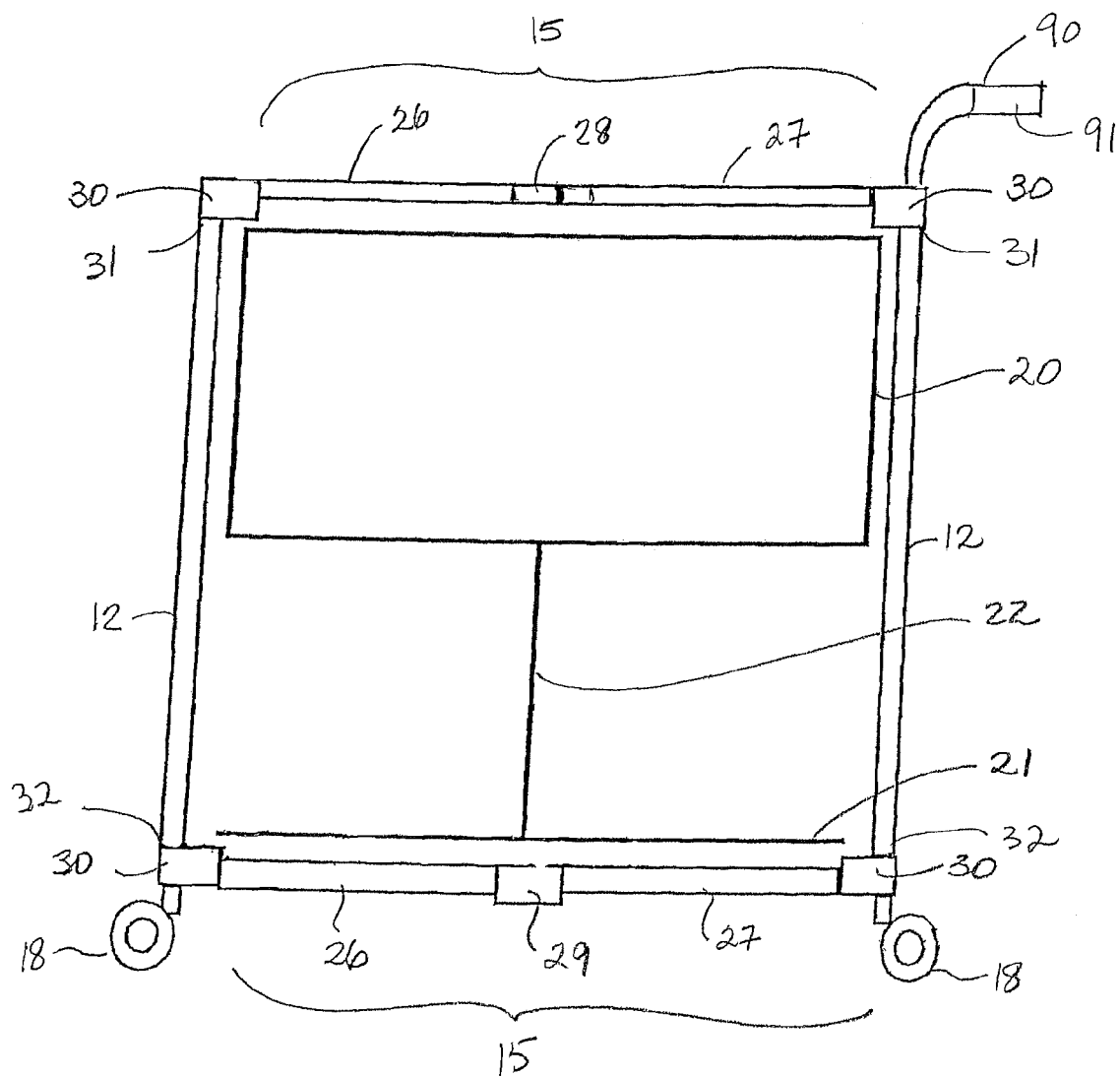
FIGS. 2A-2E illustrate the embodiment according to FIG. 1 in a variety of views, more particularly
Figure 2B:
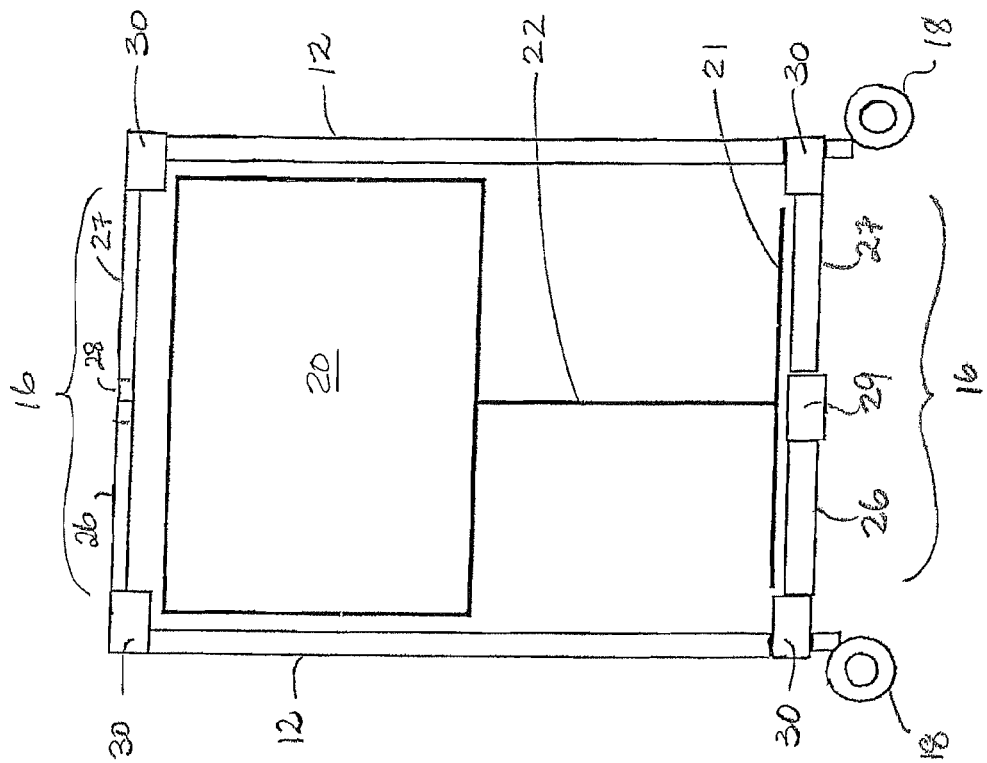
Figure 2C:
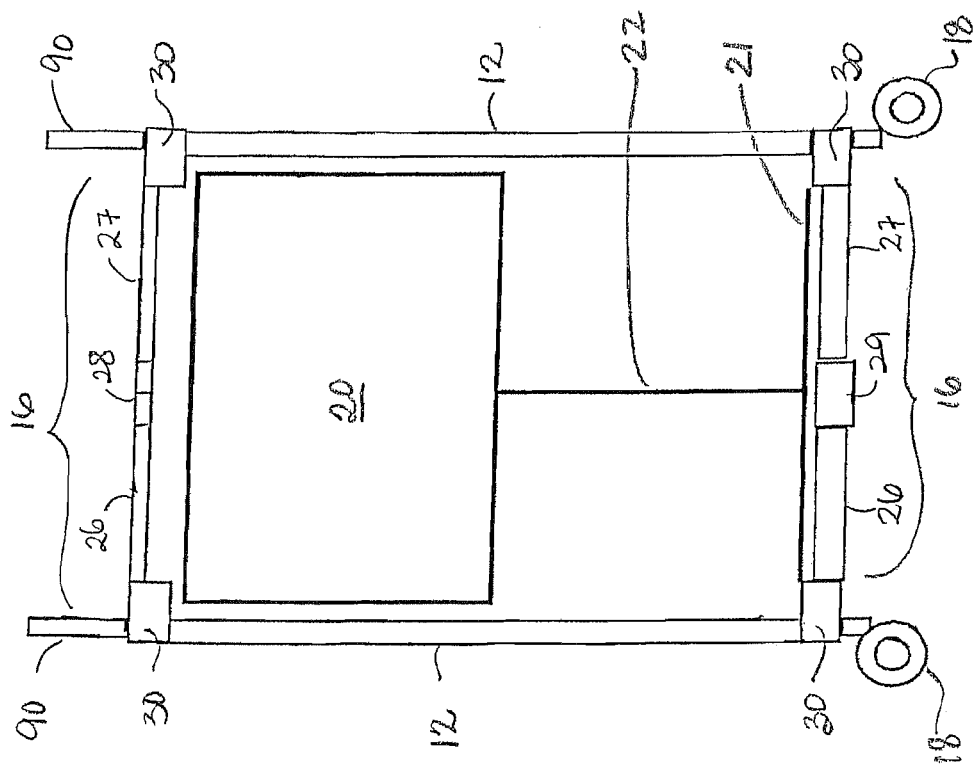
Figure 2D:
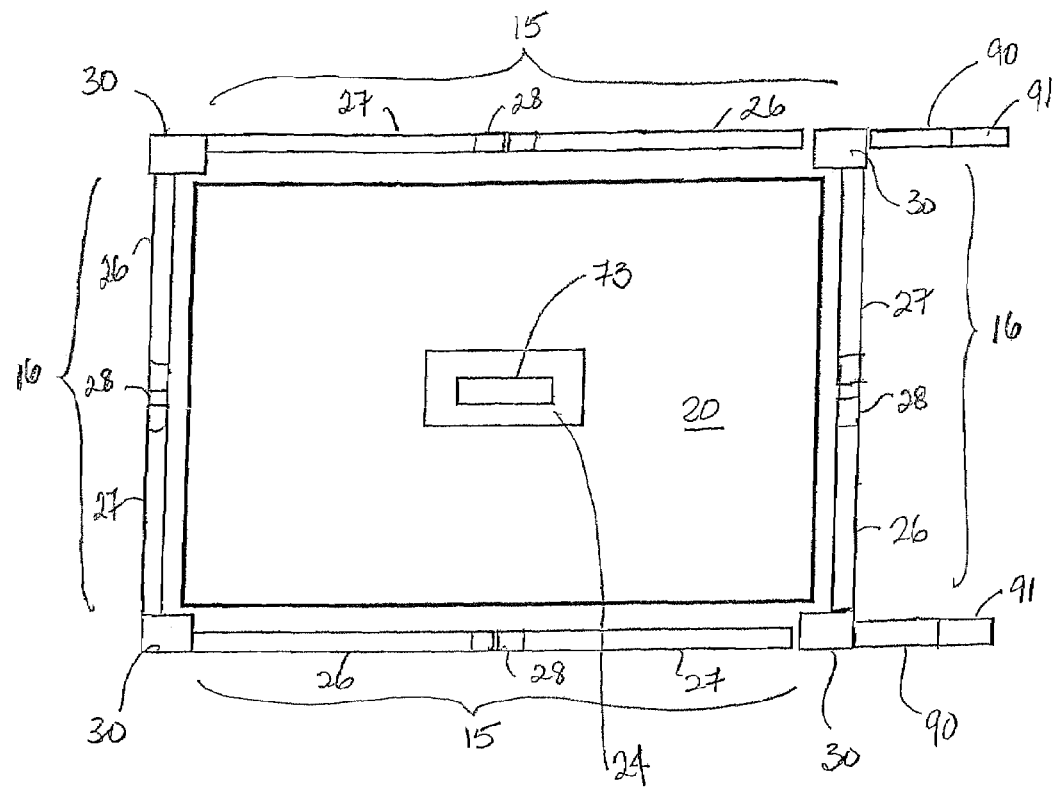
Figure 2E:
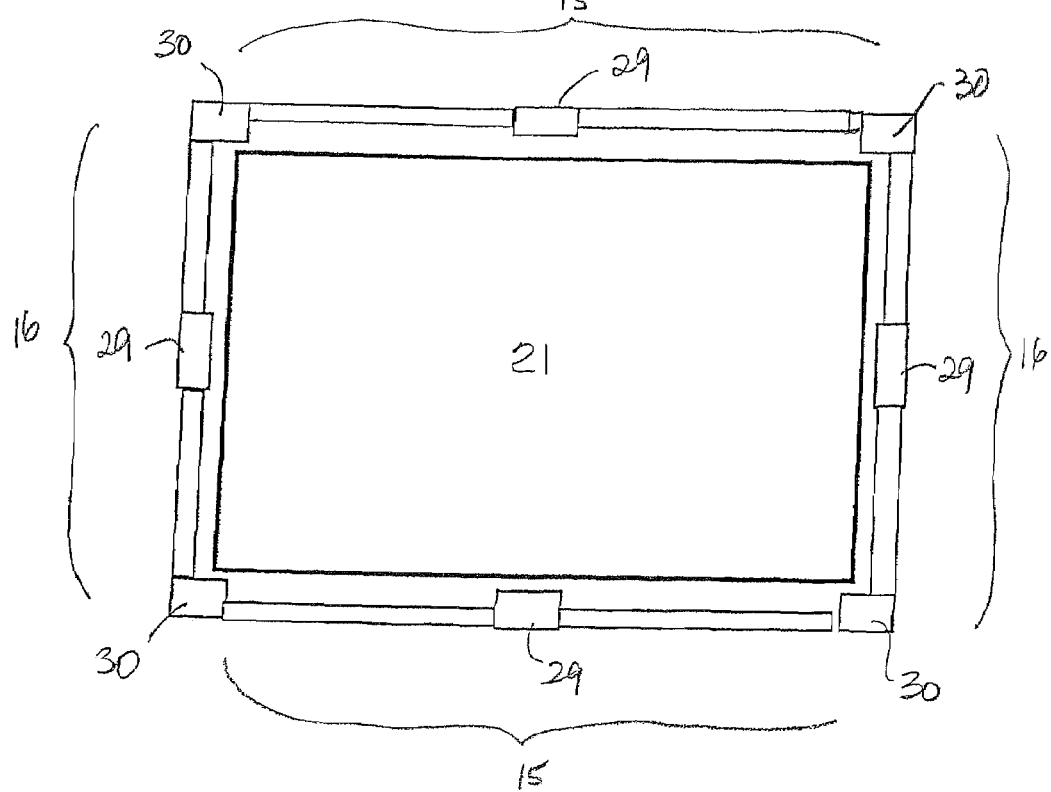

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Referring to FIGS. 1-4D, an embodiment of a portable folding utility shopping cart and carrier apparatus 10 for transporting objects is shown. The cart 10 comprises a substantially three dimensional rectangular (space) frame structure 11 formed by four substantially vertical members 12 and upper (top) 13 and lower 14 platforms hingedly connected thereto. Each of the upper and lower platforms 13, 14 is further comprised of side members 15 and end members 16 the side and end members 15 16 being hinged at about a center 17 of each of the side and end members 15,16, which form the two-dimensional substantially rectangular upper and lower platforms 13,14. The cart 10 is moveable between an open usable unfolded position and a folded position wherein the cart 10 can be readily stowed for storage.

Swivel castor wheels 18 are connected to the lower platform 14, preferably directly beneath a bottom 19 of each of the vertical members 12.

A top basket 20 is supported by the side and end members 15,16 of the upper platform 13 and a bottom shelf 21 is supported by the side and end members 15,16 of the lower platform 14. A folding support cord, basket cord or tensile connector 22, such as a strap, is connected between a bottom 23 of the upper basket 20 and the bottom shelf 21 for maintaining the top basket 20 and bottom shelf 21 in spaced relationship in the unfolded position, to maintain the top basket 20 and the bottom shelf 21 within the frame 11 in the folded position and to aid in folding the bottom shelf 21 when the cart 10 is folded. In one embodiment, the tensile member 22 is connected between about a center 24 of the bottom of the basket 23 and about a center 25 of the bottom shelf 21.

As shown in FIGS. 3A-3D, 4A-4D, 5A-5C and 6A-6D, the side and end members 15,16 of each of the upper and lower platforms 13,14 comprise two components 26,27 which are hinged together using upper swivel hinges 28 and lower swivel hinges 29 which permit the two components 26,27 to be locked in substantially end to end horizontal arrangement, in the unfolded position and further, to permit the two components 26,27 to be folded within the upper and lower swivel hinges 28,29 to permit the upper platform 13 to be folded downward (FIGS. 5A-5C) and the lower platform 14 to be folded upwards (FIGS. 6A-6D). Upper and lower swivel hinges 28,29 are typically located at about the center 17 of the side and end members 15,16 of each of the upper and lower platforms 13,14.

Further, as shown in FIGS. 7A-7E, friction hinges 30 act to connect the side and end members 15,16 of both the upper and lower platforms 13,14 to the vertical members 12 of the frame 11 and to permit the side and end members 15,16 to fold at the vertical members 12 to further assist in folding the cart 10 to a compact size. As with the upper and lower swivel hinges 28,29, the friction hinges 30, connecting the upper platform 13 adjacent a top end 31 of the vertical members 12, permit the side and end members 15,16 of the upper platform 13 to fold downwards and the friction hinges 30, connecting the lower platform 13 adjacent a lower end 32 of the vertical members 12, permit the side and end members 15,16 of the lower platform 14 to fold upwards.

Figure 5C:
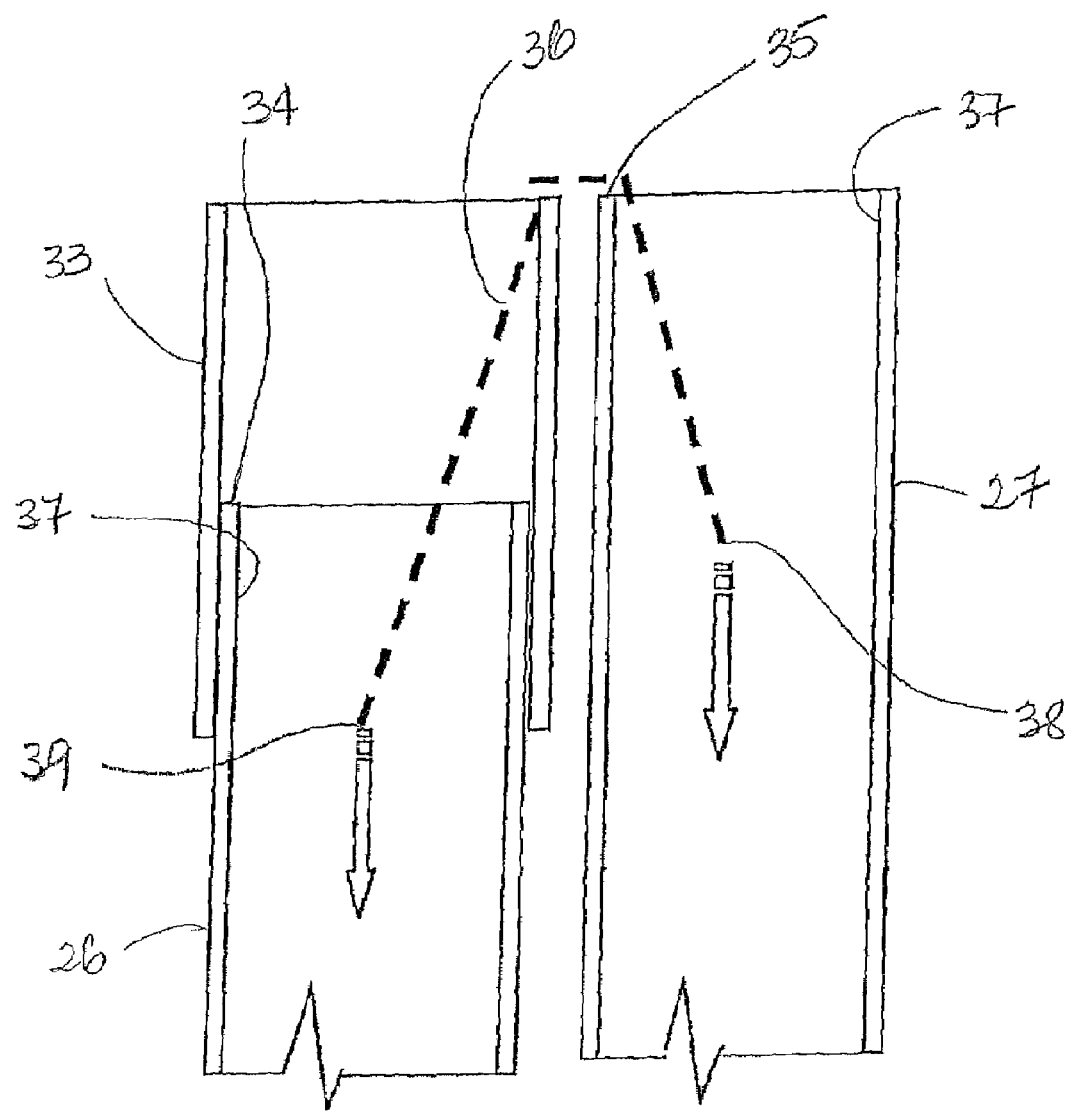
Figure 6A:
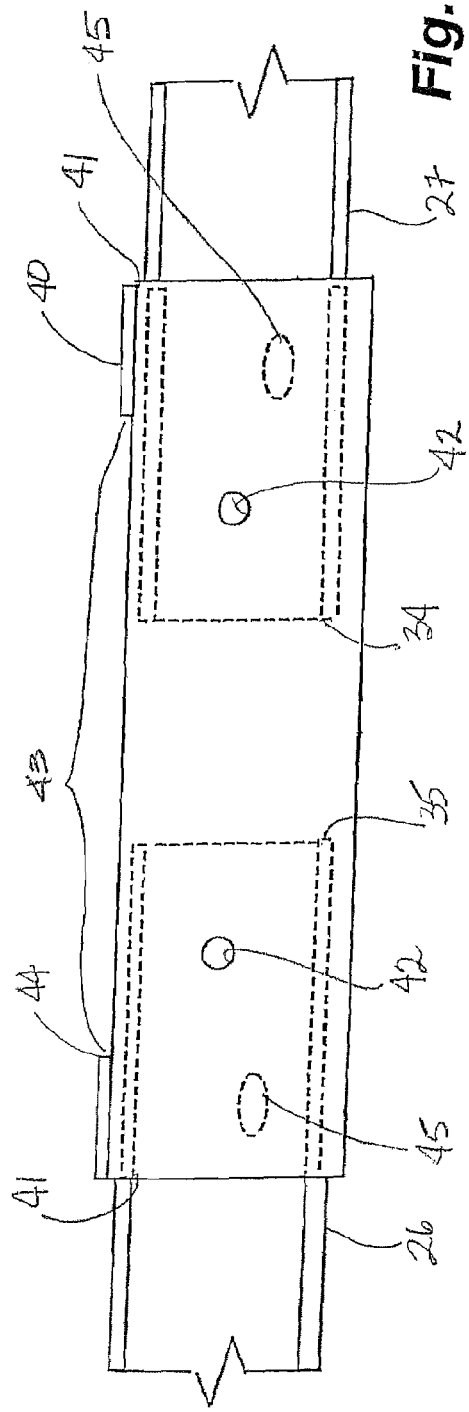
FIGS. 6A-6D are partial sectional views of a lower swivel hinge for connecting components of a lower platform so as to permit upward folding of the lower platform components, more particularly FIG. 6A a longitudinal partial sectional view illustrating the lower platform components and the swivel hinge in a locked, unfolded position.
Figure 6B:
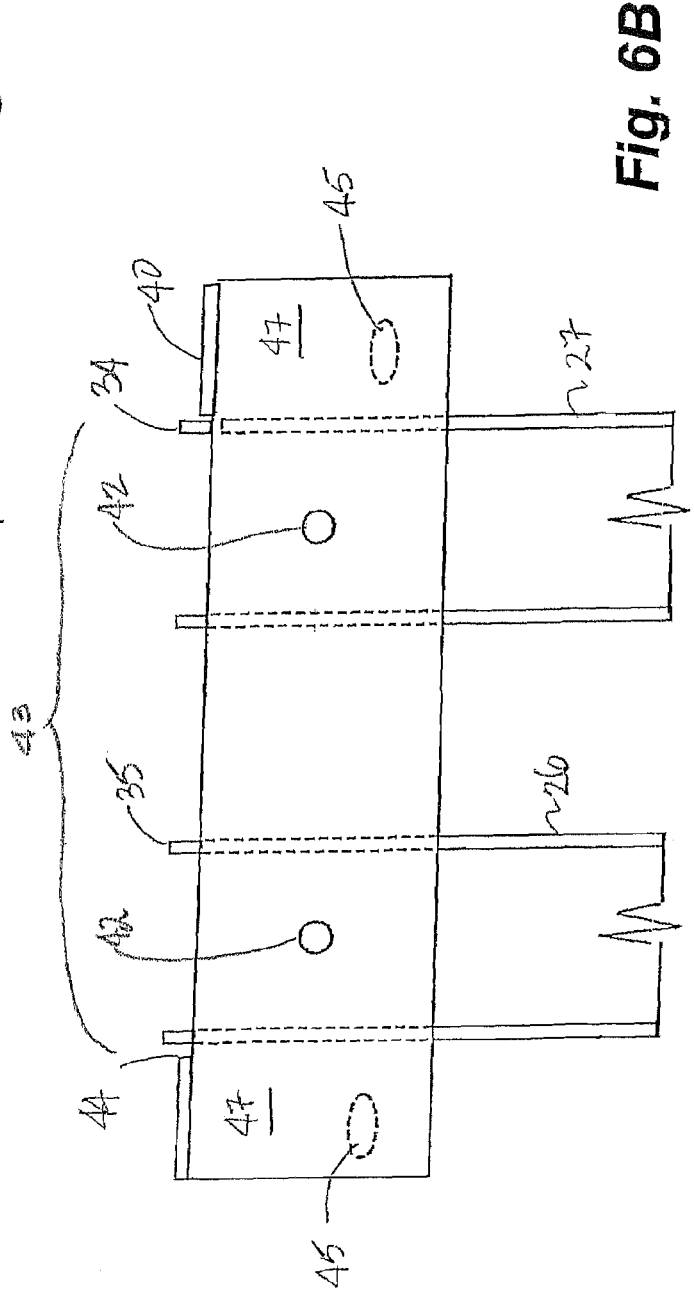
Figure 6D:
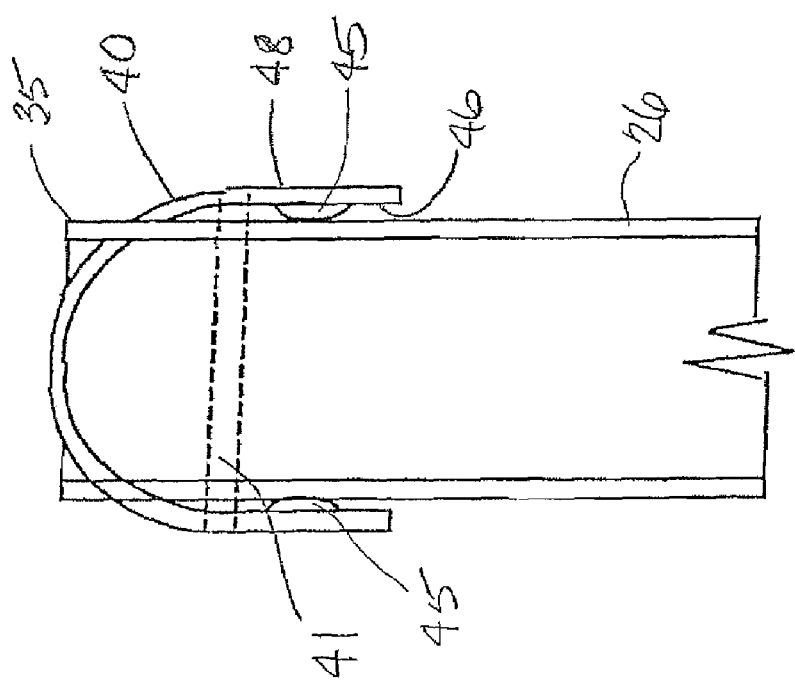
Figure 6C:
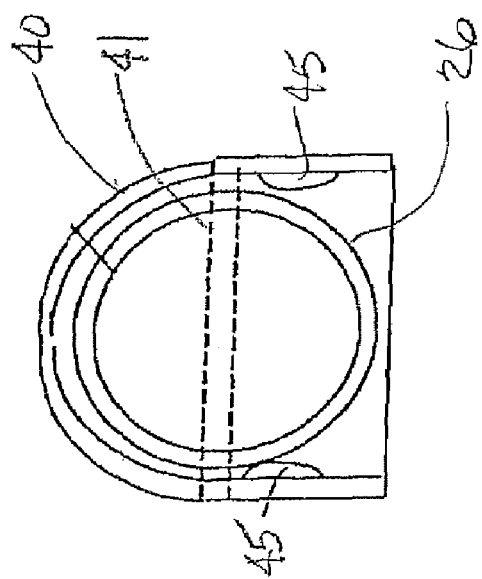
Figure 7A:
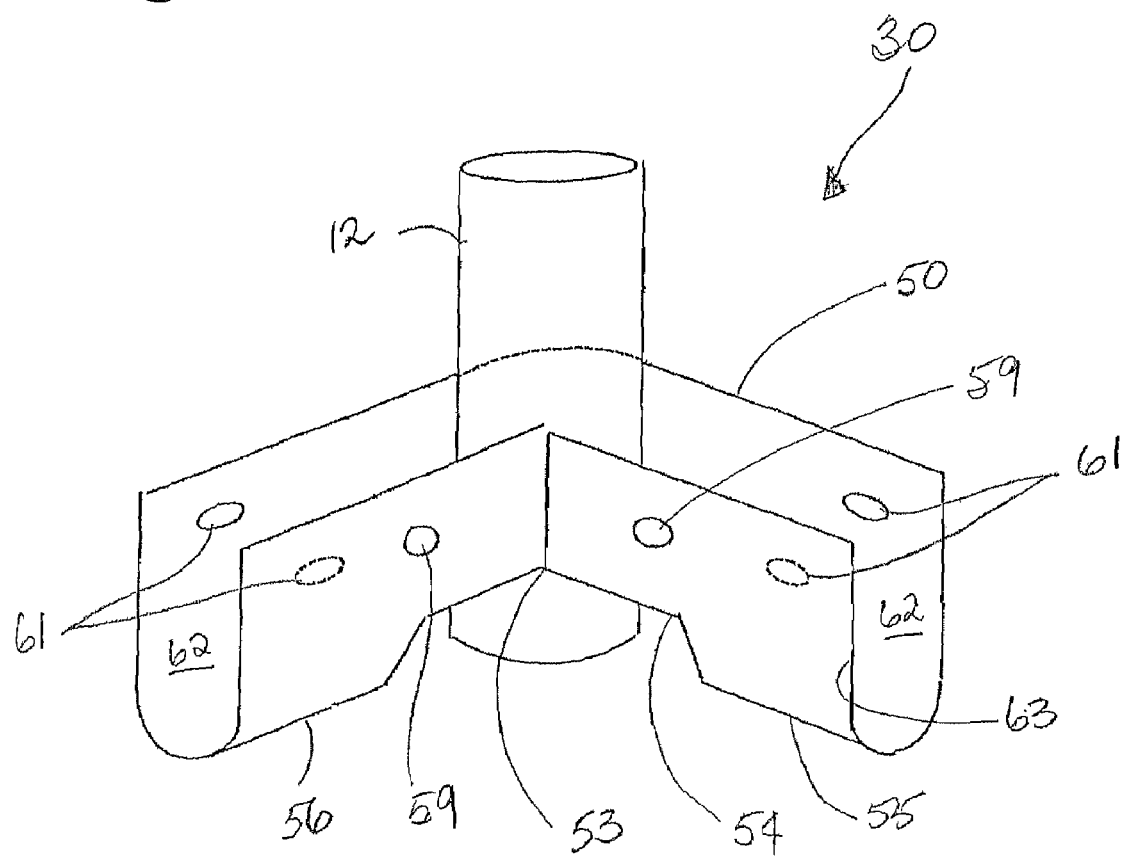
FIGS. 7A-7E are views of a friction hinge for connecting top and lower platform components to vertical members to permit folding of the cart, more particularly.
Figure 7C:
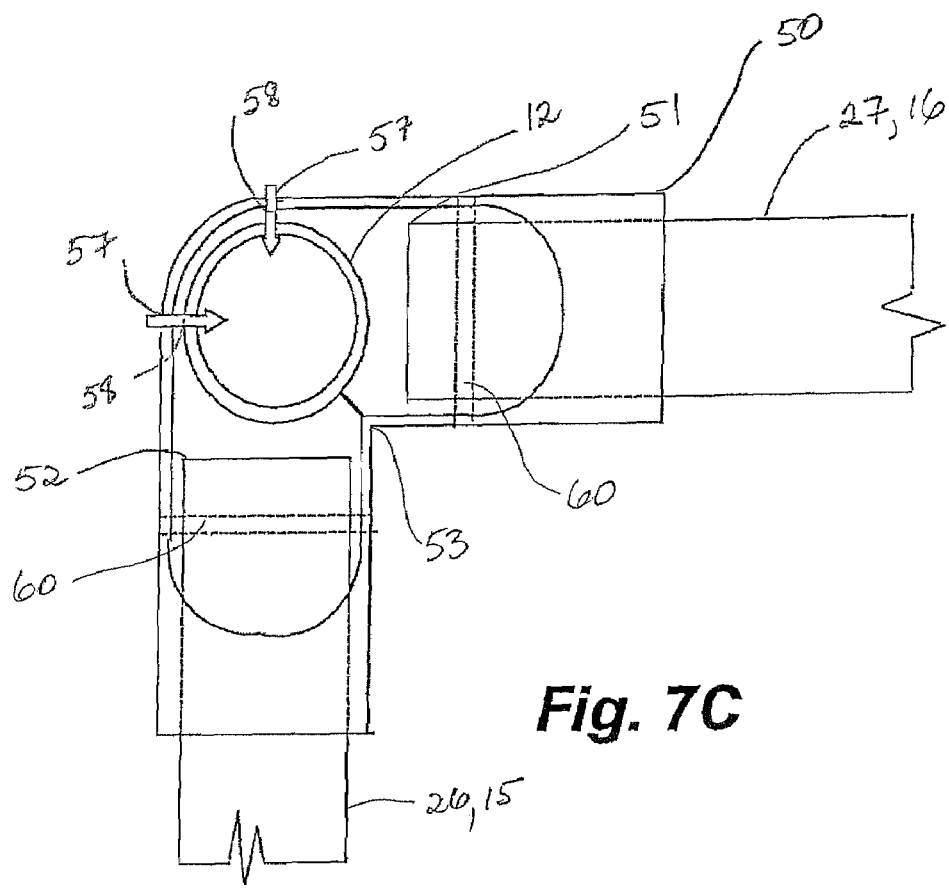
Figure 7B:
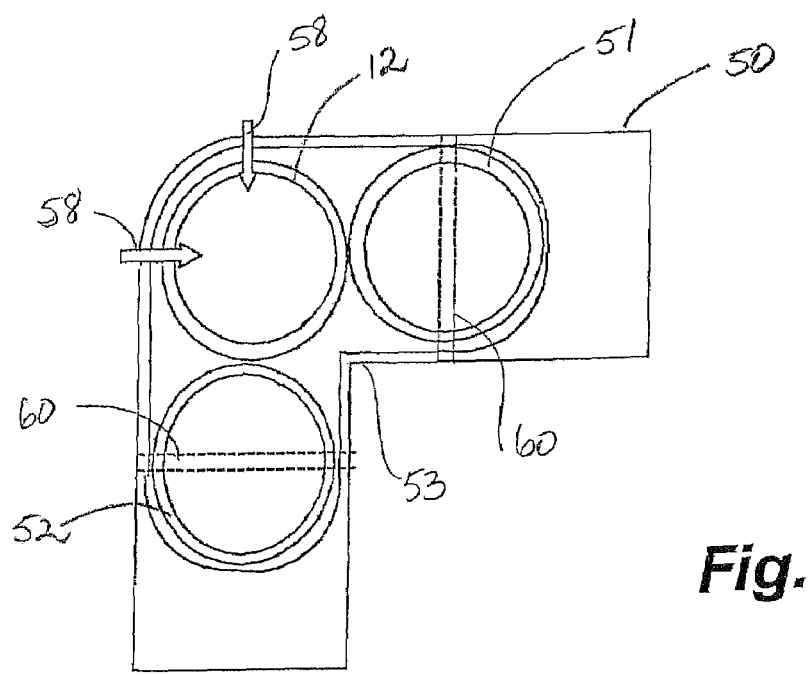
Figure 7E:
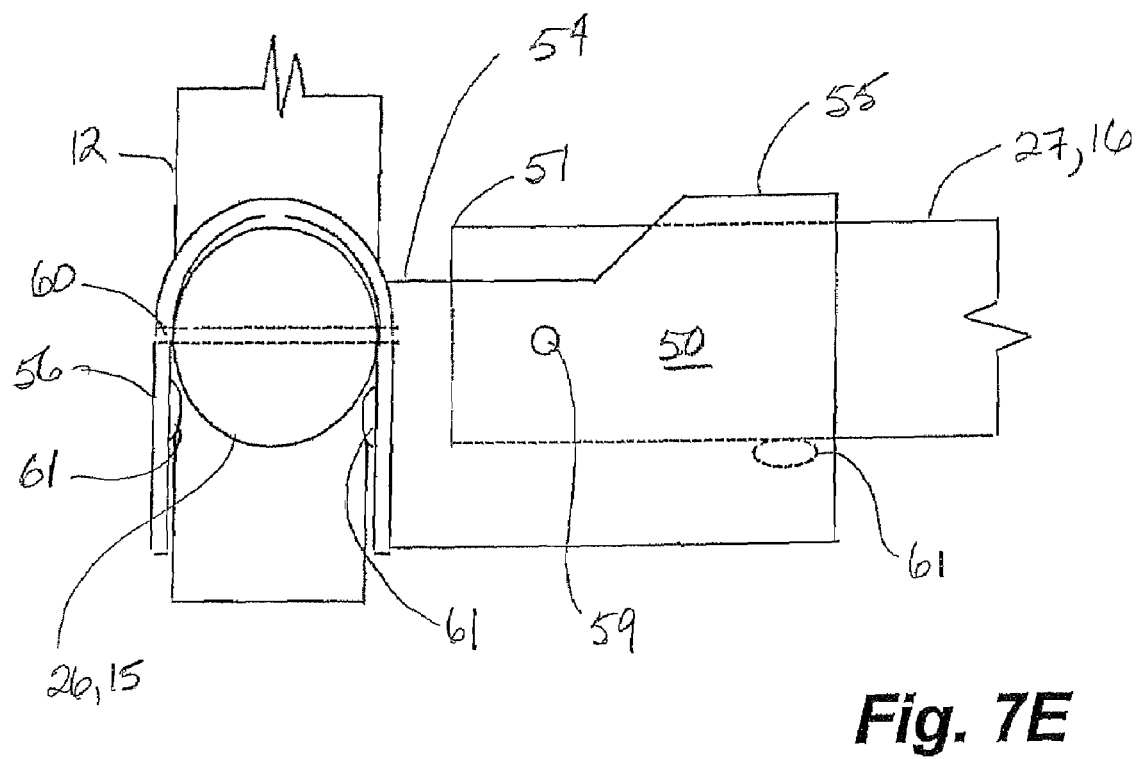
Figure 7D:
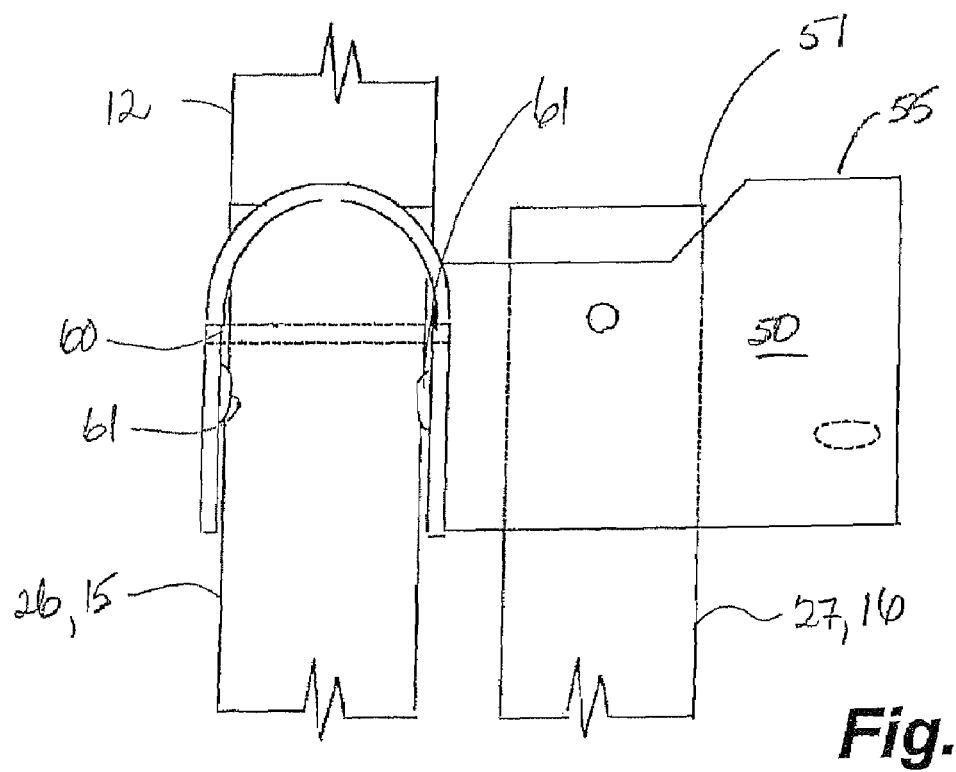

Having reference to FIGS. 5A-5C, in one embodiment, the upper swivel hinges 28 comprise a short sleeve 33 sized to fit substantially snuggly over abutted inner ends 34,35 of the two components 26,27 which form each of the side members 15 and end members 16 of the upper platform 13. The sleeve 33 is welded, crimped, or otherwise secured to one of the two components 26,27, the other of the two components 26,27 being free from the sleeve 33 and having a free inner end 35. Further, a tension member 36, preferably a spring, is passed through an inner diameter or bore 37 of both of the two components 26,27 and is secured at opposing ends 38,39 to opposing vertical members 12, typically to at least a portion of the friction hinges 30 connected to the upper platform 13. In one embodiment, the spring 36 is connected at one end 38 to a friction hinge 30 and at the opposing end 39 to a chain (not shown) which is secured to an opposing friction hinge 30. The chain is pulled through the aligned bores 37 of the two components 26,27 and stretched until a force is generated to pull the inner ends 34,35 of the two components 26,27 together inside the sleeve 33.

As shown in FIGS. 5B and 5C, and to unfold the cart 10, the two components 26,27 are pulled away from each other against the force applied by the spring 36 tension, so as to free the two components 26,27 from connection in the sleeve 33 (FIG. 5B), and are pushed downwards (FIG. 5C).

When unfolded, the free inner end 35 of the one of the two components 26,27 is aligned with the sleeve 33 and, under tension from the spring 36, the two components 26,27 assume the end to end horizontal alignment, the inner ends 34,35 being within the bore of the sleeve 33. As loads are placed in the top basket 20, the two components 26,27 are locked into place and cannot voluntarily begin to fold.

As shown in FIGS. 6A-6D, and in one embodiment, the lower swivel hinges 29 comprise a substantially U-shaped saddle 40 having open ends 41 into which inner ends 34,35, of the two components 26,27 of each of the side members 15 and the end members 16 of the lower platform 14, are fit. The inner ends 34,35 are pivotally connected to the saddle 40 by fasteners 41, such as by steel pins which pass through holes 42 formed through the saddle 40 and through the inner ends 34,35 of the two components 26,27. An opening 43 is formed in a top 44 of the saddle 40 to permit the inner ends 34,35 to extend when pivoted to the folded position. Friction means 45, such as small protrusions or bumps, are formed on an inside 46 of the saddle to assist in maintaining the two components 26,27 in the end to end horizontal arrangement in the unfolded position. Load placed on the bottom shelf 21 also assists in maintaining the two components 26,27 in end to end horizontal arrangement in the lower swivel hinge 29. The friction means 45 must be overcome in order to move the two components 26,27 to the pivoted, folded position, In one embodiment as shown in FIGS. 6A-6D, the lower swivel hinges 29 are manufactured from a steel plate or the like or from a suitable strong plastic by a process such as injected moulding. In the case of a flat piece of steel plate, the plate can be cut to shape and bent to form the U-shaped saddle 40 having two flanges 47. The bending radius is sized to accommodate the outside diameter of the side and members 15,16, which are typically hollow tubing. Four holes 42 are drilled in the saddle flanges 47 to permit passage of the steel pins therethrough to pivotally connect the saddle 40 to the two components 26,27 for movement between the folded and the unfolded position. Four friction means 45 are formed by pressing indents into the saddle flanges 47 from an outside 48 to form the protrusions or bumps 45 on the inside 46 at such positions to allow the bumps 45 to firmly hold the two components 26,27 locked in the open position when the cart is unfolded. The bumps 45 are also sized to allow the two components 26,27 to move past the bumps 45 when force is applied thereto, when the cart is folded.

As shown in FIGS. 7A-7E, friction hinges 30 used at the upper and lower platforms 13,14 are substantially the same, however the friction hinges 30 are installed on the vertical members 12 in an orientation which permits the upper platform 13 to fold downwards and the lower platform 14 to fold upwards.

Like the lower swivel hinges 29, the friction hinges 30 comprise a substantially U-shaped saddle 50 into which outer ends 51,52 of the two components 26,27 of each of the side and end members 15,16 adjacent the vertical member 12, are fit. Further, the friction hinges 30 are formed having a substantially 90 degree angle for forming a corner 53 in which an opening 54 is made to accommodate the vertical member 12 as well as the outer ends 51,52 of the side and end members 15,16 when in the folded position.

The friction hinges 30 are affixed to the vertical members 12 adjacent the top and lower end 31,32 of each of the four vertical members 12.

In one embodiment show in FIGS. 7A-7E, like the lower swivel hinges 29, the friction hinges 30 are manufactured from a steel plate or the like or from a suitable strong plastic such as by an injected moulding process. In the case of a flat piece of steel plate, the plate can be cut to shape and bent to form the U-shaped saddle 50. The bending radius accommodates the outside diameter of the side and end members 15,16. Two flanges 55,56 are formed as well as the substantially 90-degree corner 53 between the flanges 55,56 to enable the friction hinges 30 to fit snugly around the vertical components 12. The opening 54 in the saddle 50 is sized to allow the vertical member 12 to extend therethrough as well as the outer ends 51,52 of the side and end members 15,16, when folded. Holes 57 are drilled through the corner 53 area between the flanges 55,56 to permit fasteners such as pop rivets or the like 58 to permanently fasten the friction hinge 30 about the vertical member 12.

Further, four holes 59 are drilled in the flanges 55,56 to accommodate pivoting fasteners 60, such as steel pins, for pivotally connecting the side and end members 15,16 to the friction hinges 30, for pivoting of the side and end members 15,16 thereon during the folding and unfolding processes. Four friction means or bumps 61, are formed on an inside 62 of the saddle 50 by pressing indents into the flanges 55,56 from an outside 63 of the saddle 50. The bumps 61 are formed at such positions and sized to allow the bump 61 to firmly hold the side and end members 15,16 in the open position when the cart 10 is unfolded, but will allow the side and end members 15,16 to move past when force is applied thereto when the cart 10 is folded.

Further, the flanges 55,56 of the friction hinges 30 protrude sufficiently into a space S defined by the cart frame 11 to create space sufficient to accommodate folding of the top basket 20 and bottom shelf 21 therein.

Figure 8A:
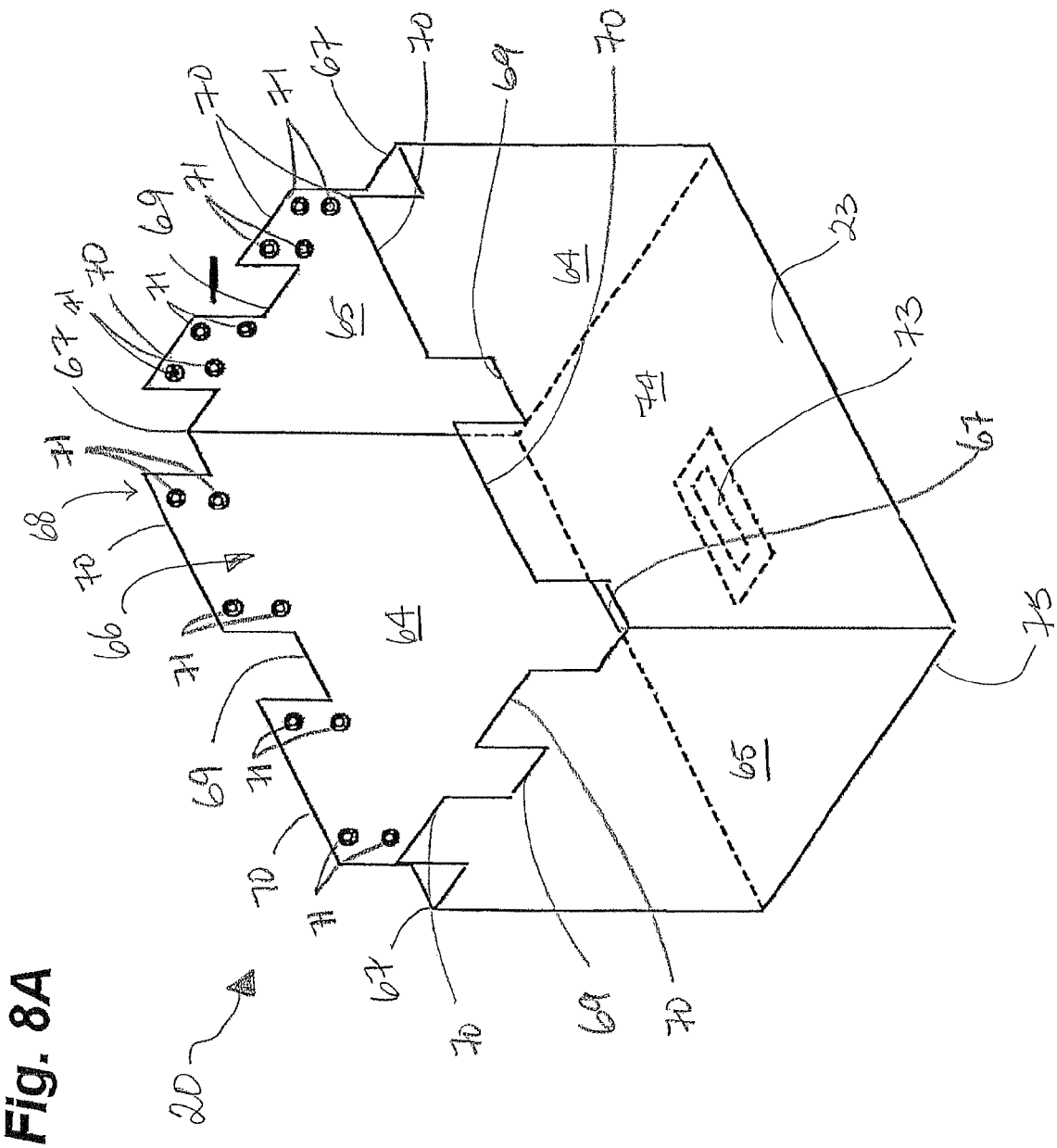
FIGS. 8A and 8B are isometric views of the top basket, the bottom shelf and a tensile member connected therebetween, clips being used to attach the basket and shelf to the cart frame, more particularly.
Figure 9A:
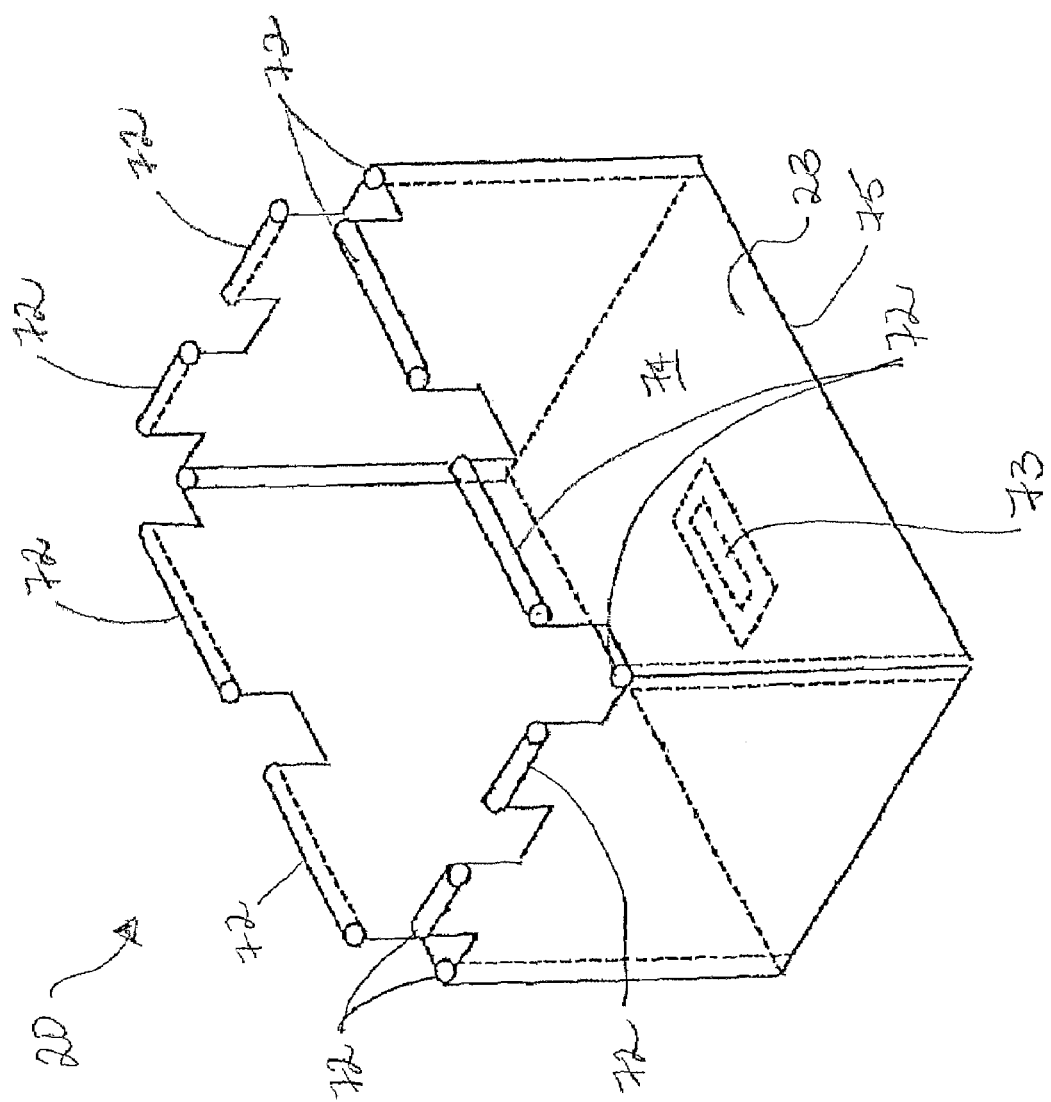
FIGS. 9A and 9B are isometric views of the top basket, the bottom shelf and a tensile member connected therebetween, sleeves being used to attach the basket and shelf to the cart frame, more particularly.

Having reference to FIGS. 1, 2A, 3A, 8A and 9A, the top basket 20 is a rectangular shaped basket having enclosed sides 64, ends 65, the bottom 23 and an open top 66. The basket 20 is typically manufactured from a flexible material, such as a canvas or the like, which is suitable for supporting loads placed therein whilst being flexible enough to fold into the space S within the frame 11 when the cart 10 is in the folded position. The top basket 20 is sized and shaped to fit into a space U defined by the side and end members 15,16 of the upper platform 13 and is supported therefrom. As best seen in FIGS. 8A and 9A, upper corners 67 of the basket 20 are cut out to facilitate upper friction hinges 30. Further, accommodation is made along a peripheral upper edge 68 of the sides 64 and the ends 65, such as about a center 69, for the upper swivel hinges 28, connecting the components 26,27 of the upper platform 13.

In one embodiment, shown in FIG. 8A, one or more elongate flaps 70 are formed at the peripheral edge along at least a portion of the upper edge 68 leaving the corners 67 and about the center 69 of each side 64 and end 65 open to accommodate the upper swivel and friction hinges 28,30 and are fit with fasteners 71, such as co-operating male and female snap fasteners, or the like. When the top basket 20 is lowered into the space U defined by the upper platform 13, the flaps 70 are folded over the side and end members 15,16 of the upper platform 13 and the co-operating male and female snap fasteners 71 are engaged for securing the top basket 20 thereto.

Alternatively, as shown in FIG. 9A, the top basket 20 can be secured to the upper platform 13 by elongate sleeves 72 which are formed along at least a portion of the upper edge 68 of basket 20 through which the side and end members 15,16 of the upper platform 13 are fit. The sleeves 72 are positioned so as to avoid interference with the upper swivel and friction hinges 28,30. Sleeves 72 are also provided for the vertical members 12.

A flexible basket handle 73, typically made from the same material as the basket, is affixed to about the centre 24 of an inner surface 74 of the bottom 23 of the top basket 20, typically at a position which corresponds to the connection of the tensile connector 22 on an opposing surface 75 of the bottom 23 of the top basket 20. During folding of the cart 10, the handle 73 permits the user to grip the bottom 23 of the basket 20 and lift both the basket bottom 23 and the tensile connector 22, causing the bottom shelf 21 to fold upward with the lower platform 14 and to ensure the top basket 20 and the bottom shelf 21 are retained within the space S within the frame 11, when folded.

As shown in Figs. FIGS. 1, 2A, 3A, 8B and 9B, the bottom shelf 21 is a flat rectangular-shaped shelf, typically manufactured from a flexible material such as is used for the top basket 20. The bottom shelf 21 is shaped to fit a space V defined by the lower platform's end and side members 15,16 and is supported thereon.

Figure 8B:
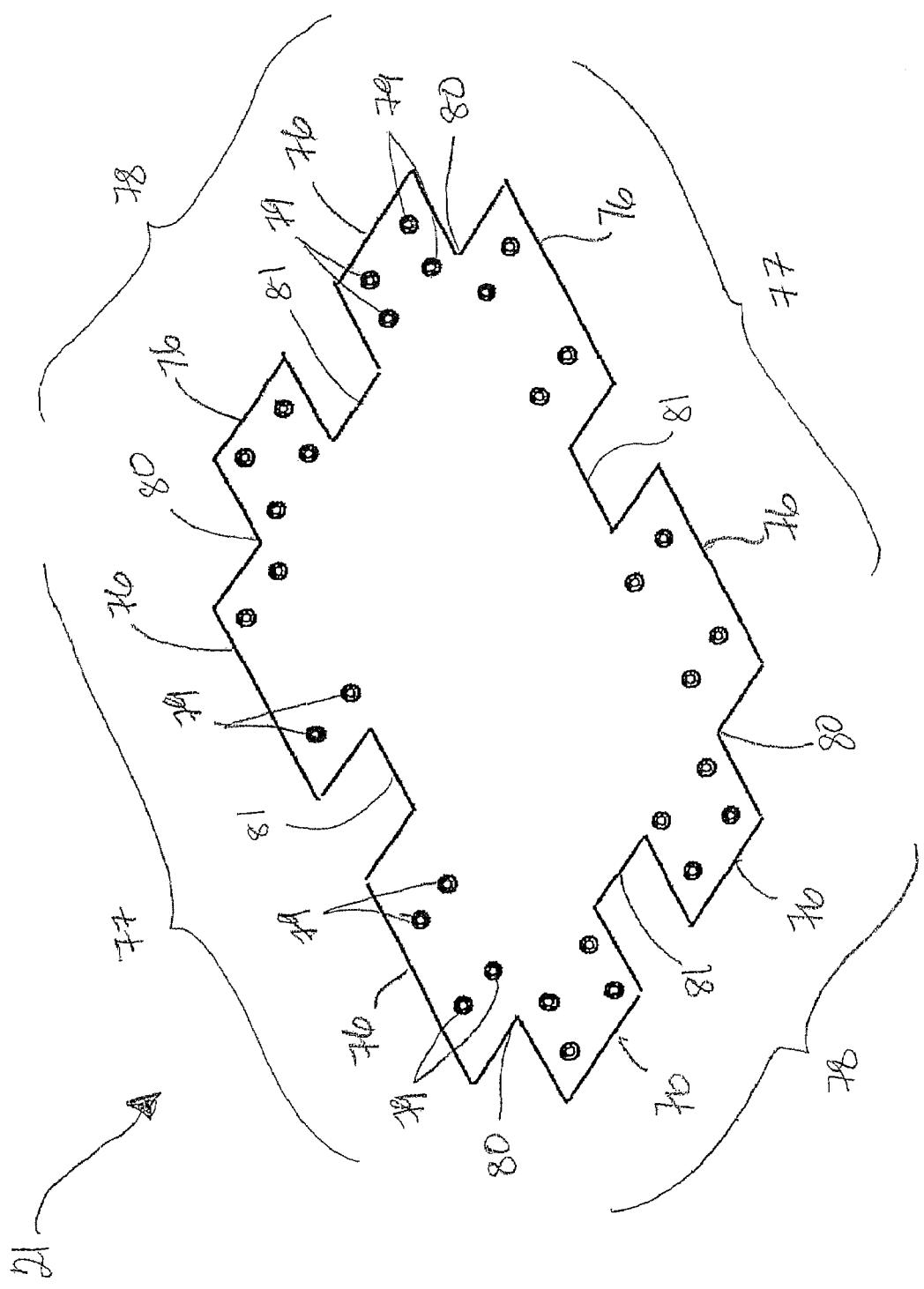

In one embodiment, seen in FIG. 8B, the bottom shelf 21 is further shaped having one or more elongate flaps 76 formed on sides 77 and ends 78 of the shelf 21, the flaps 76 being fit with fasteners 79, such as co-operating male and female snap fasteners. In one embodiment, flaps 76 are formed leaving openings at corners 80 and about a center 81 of each side 77 and end 78 to avoid interference with the lower swivel and friction hinges 29, 20 for folding. The flaps 76 are folded over each of the side and end members 15,16 of the lower platform 14 and the cooperating male and female snap fasteners 79 are engaged for securely fastening the shelf 21 to the lower platform 14.

Figure 9B:
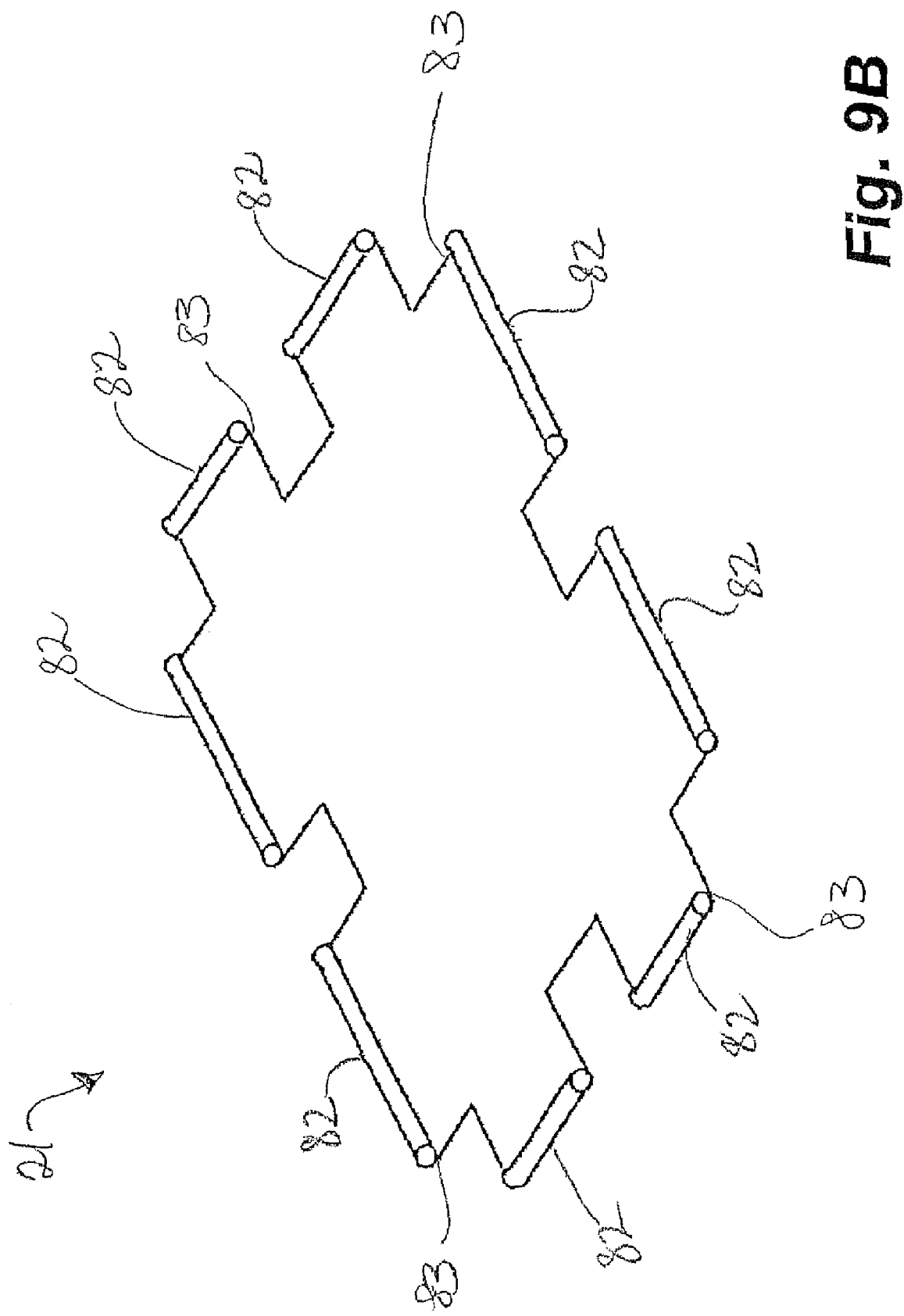

Alternatively, as shown in FIG. 9B, the bottom shelf 21 can be secured to the lower platform 14 by elongate sleeves 82 which are formed at a peripheral edge 83 along at least a portion of each side and end 77,78 of the lower shelf 21, through which the side and end members 15,16 of the lower platform 14 are fit. The sleeves 82 are positioned so as to avoid interference with the lower swivel and friction hinges 29,30.

Typically, the cart 10 is fitted with handles 90 which, in one embodiment, are upwardly extending outwardly curving extensions of both of the vertical members 12 at one end of the cart 10. The handles 90 are typically round or squared in section depending upon the shape of the tubular material from which the vertical members 12 are formed. Ends of the handles 90 are fitted with non-slip grips 91 such as rubber caps or the like.

The swivel castor wheels 18 facilitate the easy motion of the cart 10 in forwards, sideways and backwards directions. In one embodiment, the castor wheels 18 are of industrial strength and are preferably made from steel or steel alloys or the like having sufficient strength to carry the loads placed into the cart, particularly when traversing over rough surfaces. The wheels are connected to the bottoms 19 of the vertical members 12 such as by a pin that is welded onto a swivel of the wheels 18 and extends upwardly therefrom and a spacer bushing that holds the pin securely in position inside the vertical member's tubular bore (not shown). A rubber tread or the like is formed about the running surface of the wheels 18 to prohibit slipping in wet or smooth surface conditions.

The portable folding shopping cart and utility carrier 10 can be made from a number of different materials. In one embodiment, the structural components, which include the vertical members 12, the side and end members 15,16 and the handles 90, are made of a thin walled metal tubing manufactured from steel, aluminium or the like. In other embodiments, the structural components may be manufactured from hollow carbon fiber, plastics and the like.

The swivel and friction hinges 28,29,30 are manufactured from a thin steel or aluminium plate, or alternatively may be injected or thermoform moulded or the like.

The top basket 20 and bottom shelf 21 are manufactured from a fabric materials, such as a light canvas type material or the like, that is sufficiently strong to carry the loads placed therein and are able to fold easily to accommodate the folding process of the cart. In one embodiment the top basket 20 is capable of carrying about 75 pounds and the bottom shelf 21 is capable of carrying about 50 pounds.

Different colors and designs on the fabric components can be incorporated to embody the various types of activities of users of the portable folding shopping cart and utility carrier 10. Moulding and mass production processes relatively inexpensively production, thereby making embodiments of the invention available to the consumer at a low cost.

Optionally, once folded, a VELCRO™ or bungee cord type strap or the like 104 is provided to wrap about the folded cart 10 to hold the cart 10 in the folded position until the strap 104 is released for unfolding the cart 10.

In Use

Having reference to FIGS. 3A-3D and 4A-4D, the portable folding shopping cart and utility carrier 10 is capable of being folded into a small portable unit for storage when not required.

Figure 3A:
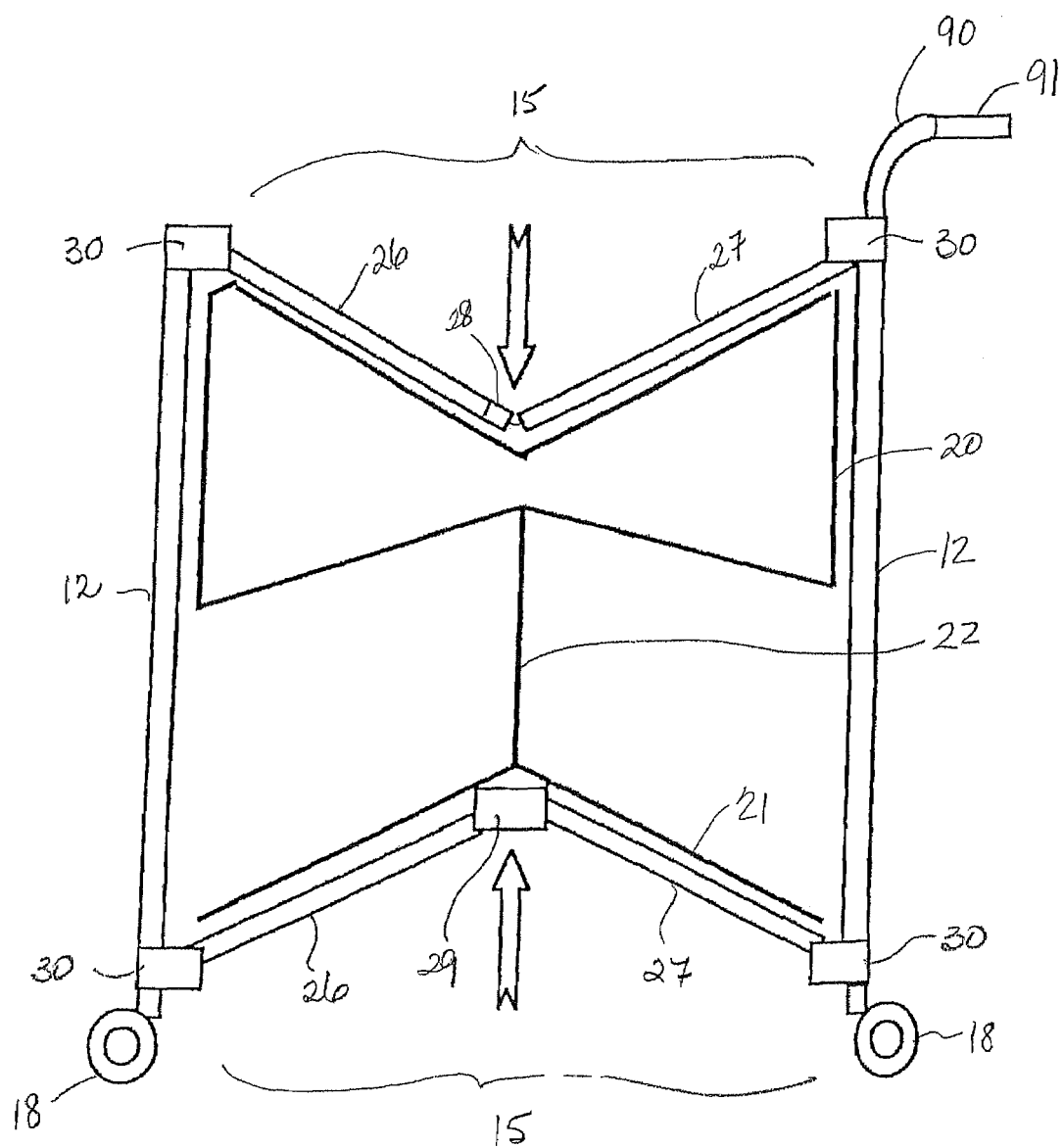
FIGS. 3A-3D illustrate folding of the embodiment according to FIG. 1, more particularly.
Figure 3B:
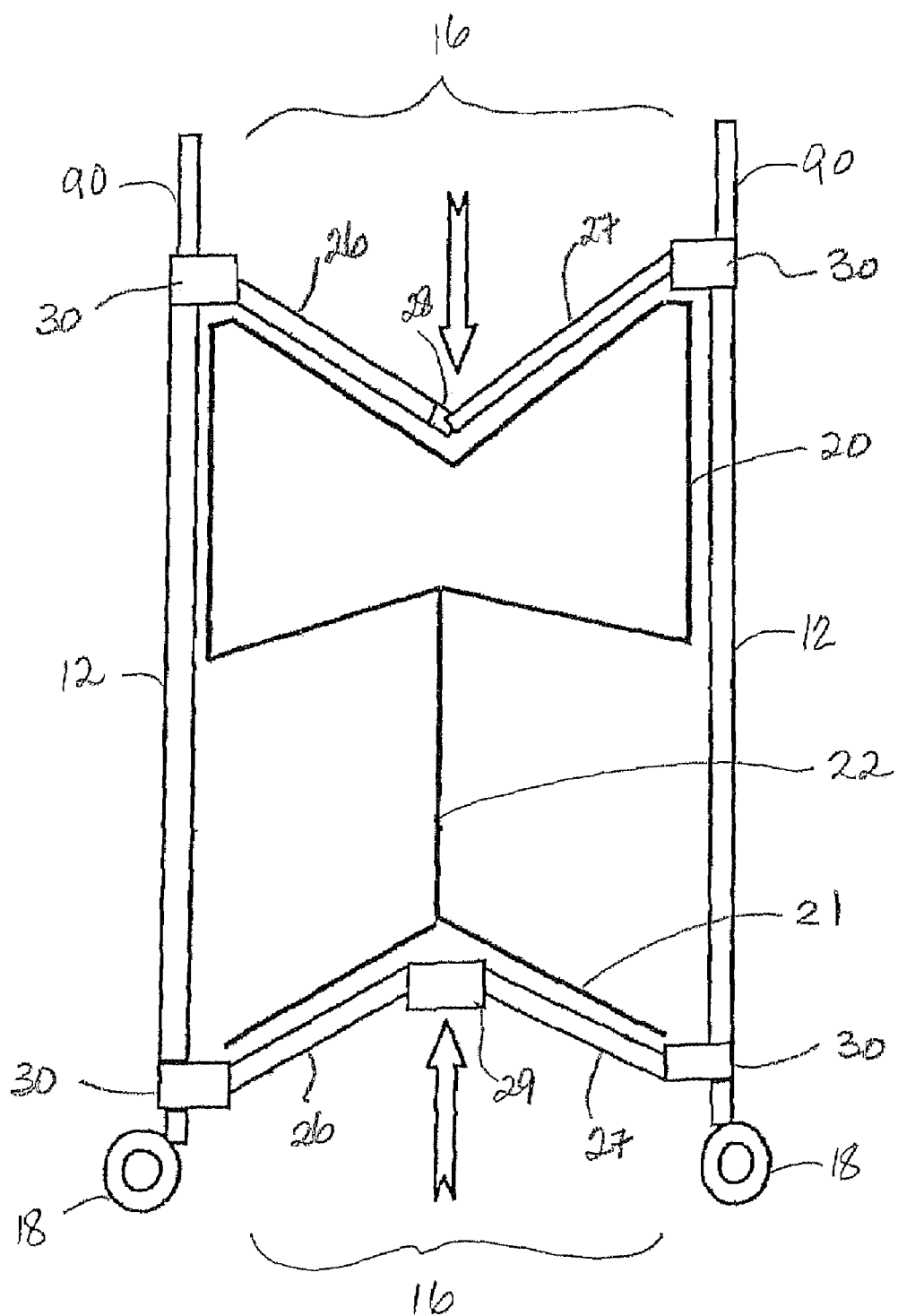
Figure 3D:
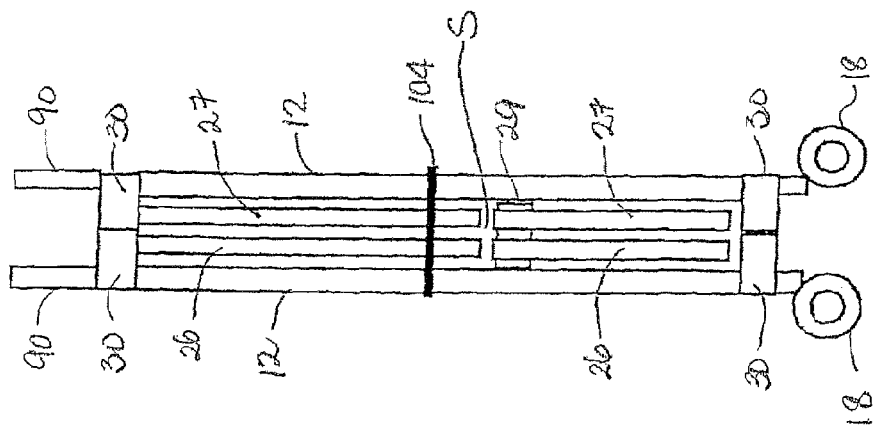
Figure 3C:
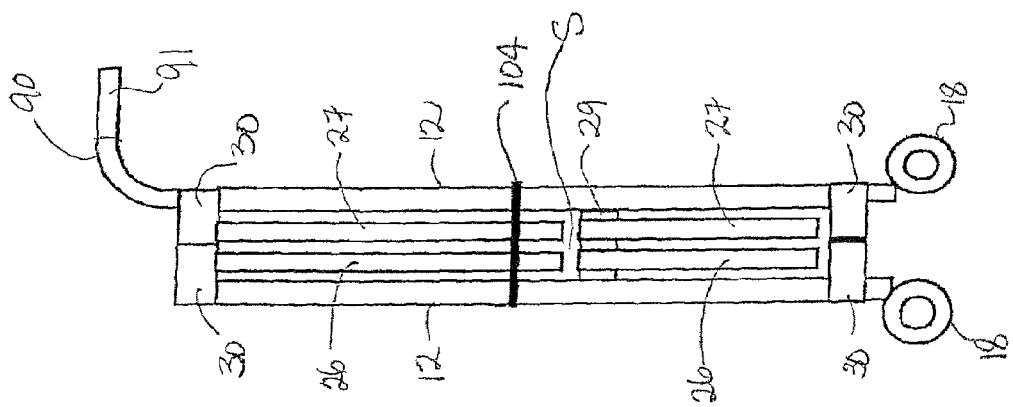
Figure 4A:
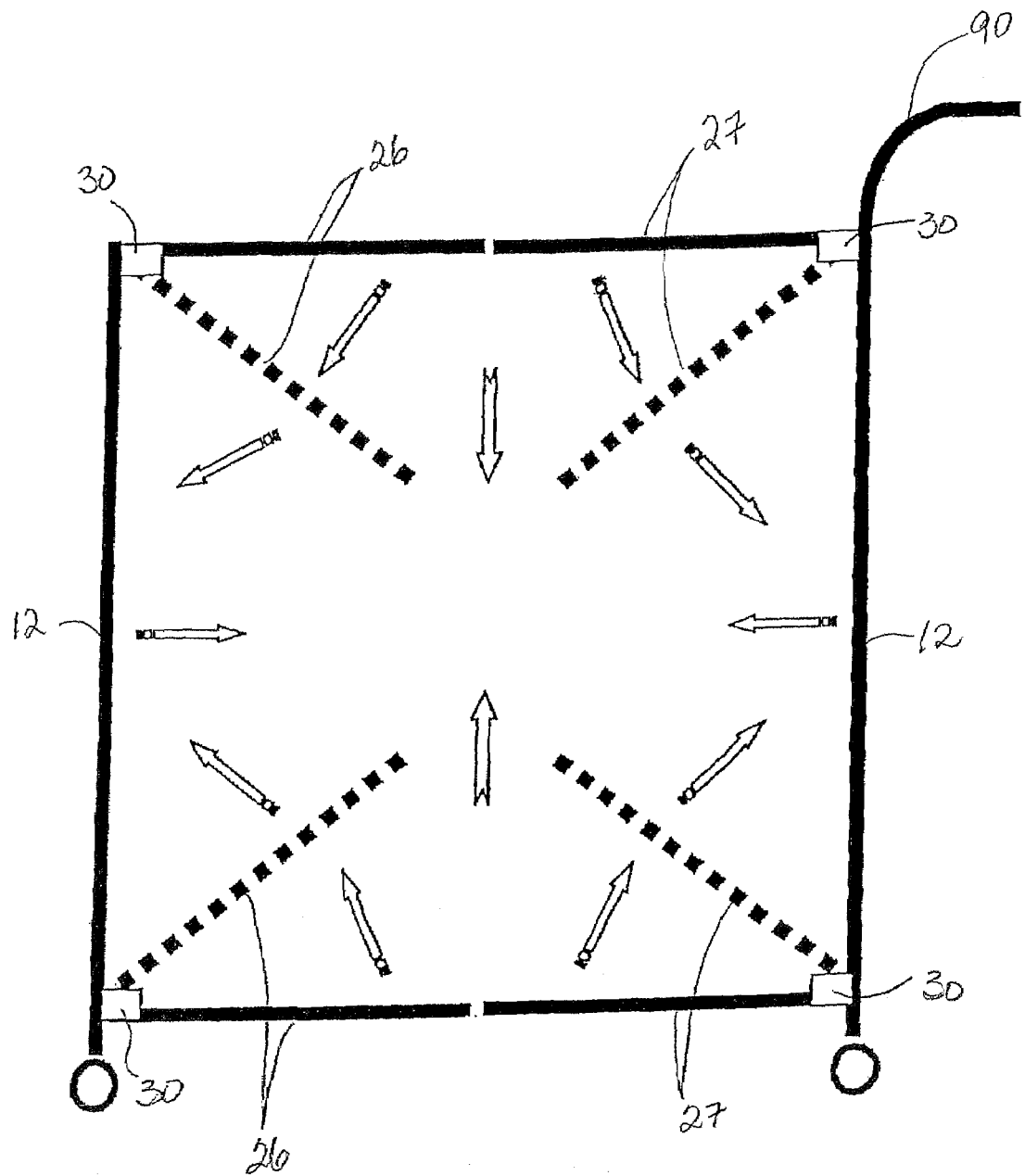
FIGS. 4A-4D are schematic views according to FIGS. 3A-3D, dashed lines illustrating a top and bottom platform in a partially folded position and arrows illustrating the direction of movement of the cart components during folding, more particularly
Figure 4B:
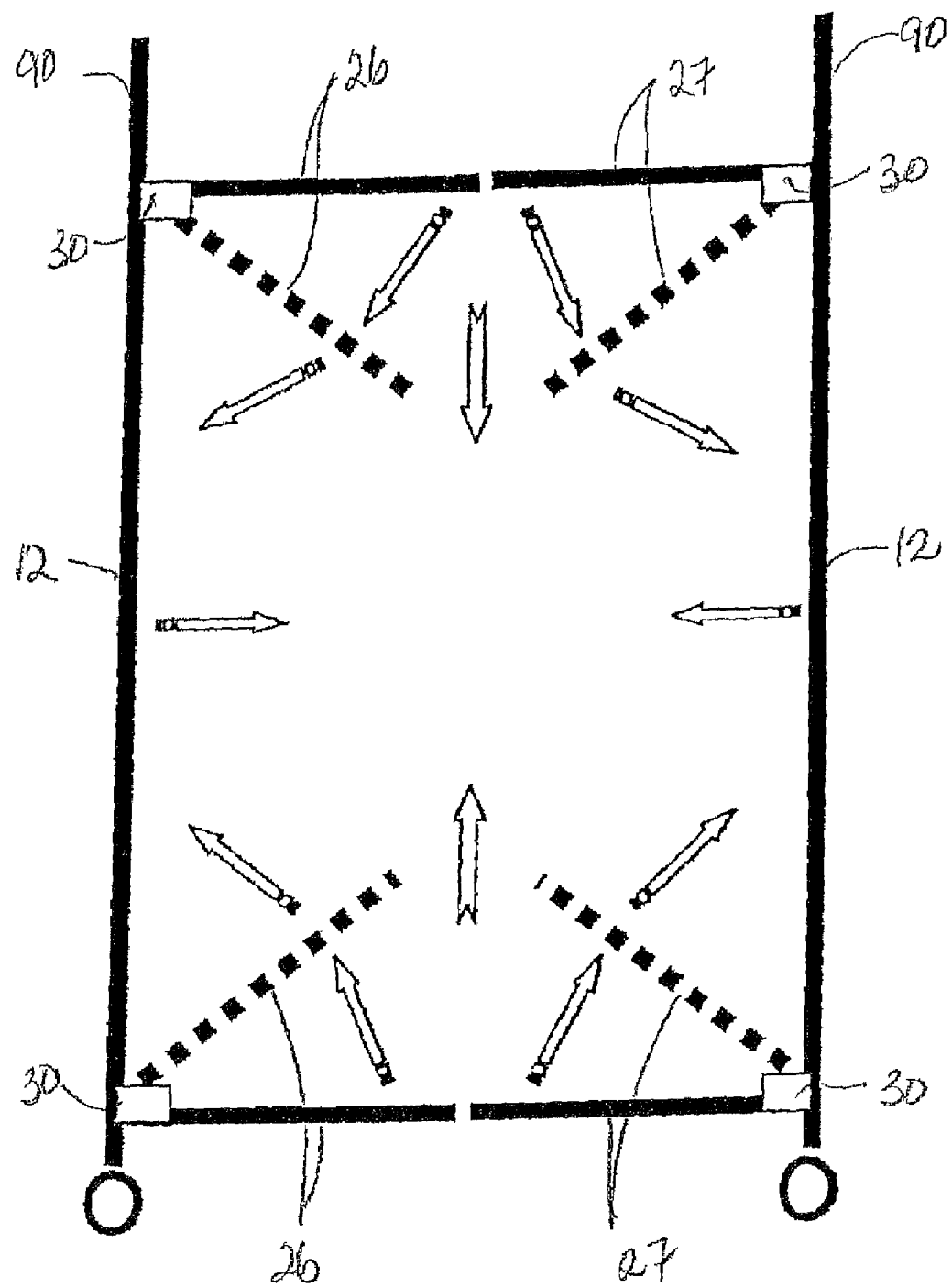
Figure 4D:
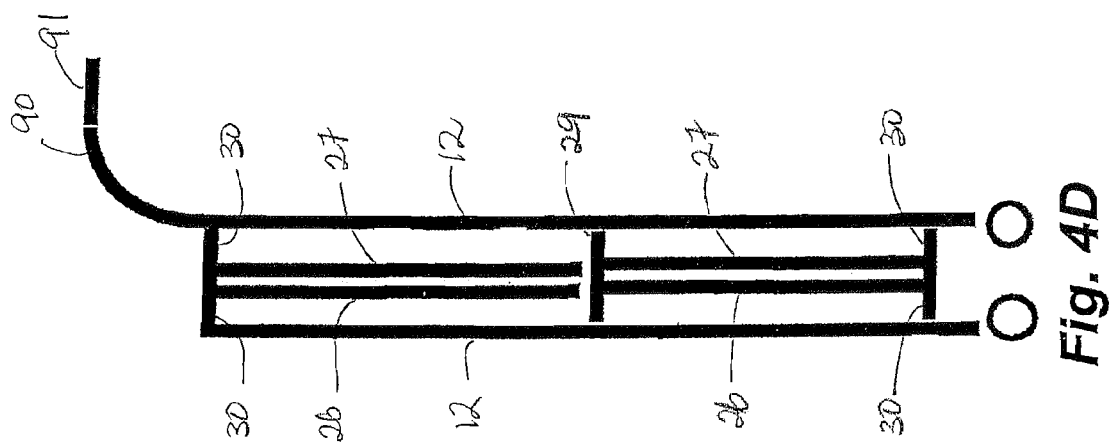
Figure 4C:
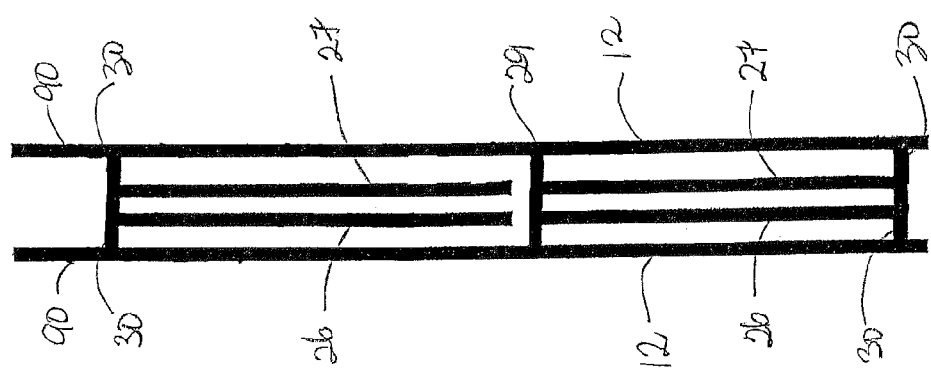

Folding the Cart:

The first step in the folding process is to release the lower platform's side and end members 15,16 from the locked unfolded position. To initiate the first step, the basket pull handle 73 is grasped and pulled upwards to create a lifting force which is transferred to the tensile connector 22, connected between the top basket 20 and the bottom shelf 21, and thus, to the bottom shelf 21. The upward force on the bottom shelf 21, typically at about the center 25 of the shelf 21 is transferred to the lower swivel hinges 29 connecting the side and end members 15,16 of the lower platform 14, causing the lower swivel hinges 29 to overcome the friction bumps 45 and fold upwards in the direction of the lifting force. The user then exerts sufficient force to overcome the friction bumps 61 on the lower friction hinges 30, unlocking the side and end members 15,16 from the lower friction hinges 30 and permitting the side and end members 15,16 to pivot about the pins 41 towards the folded position. The lower platform's side and end members 15,16 are substantially only permitted to move in a vertical plane due to constraints imposed by the lower swivel and friction hinges' flanges 47,55,56. The upward folding movement of the lower platform's members 15,16 is partially completed as shown in FIGS. 3A and 3B. The basket handle 73 is released at this stage of folding, the cart 10 being vertically geometrically stable on the wheels 18, permitting the user to initiate the next step of the folding process.

The next step of the folding process is to unlock and fold the side and end members 15,16 of the top platform 13. The two components 26,27 of each of the side and end members 15,16 are grasped and pulled apart against the force applied therein by the tension spring 36. Once the free end 35 is pulled from the sleeve 33, the user applies a force to fold the two components 26,27 downwards. Force is applied to the side and end members 15,16 at the friction hinges 30 to overcome the friction means 61 and permit the side and end members 15,16 to pivot about the pins 58 towards the folded position. The vertical members 12 are moved towards one another until the cart 10 is in the compact folded position (FIGS. 3C, 3D, 4C and 4D), the top basket 20 and bottom shelf 21 having automatically folded within the space S defined therebetween.

If the strap 104 is provided, the final step in the folding process is to pull the strap 104 around the outside of the vertical members 12 to assist in moving the vertical members 12 closer together in compact folded arrangement, The strap 104 is then fastened about the folded cart 10 using a fastener such as a clip or the like (not shown).

Unfolding the Cart:

When required for use, the cart 10 is unfolded substantially by reversing the process as described for folding of the cart 10.

The cart 10 is first placed in a vertical position supported on the wheels 18 where it is typically capable of standing independently. If provided, the strap 104 is released from about the folded cart 10.

Two of the vertical members 12 are grasped, typically the two vertical members 12 at one end of the cart 10, and pulled away from one another. This is repeated with the remaining two vertical members 12 until the cart 10 is partially unfolded as shown in FIGS. 3A and 3B. The process is repeated again by pulling apart vertical members 12 at opposing ends of the cart 10 until the upper and lower platforms 13,14 are substantially in horizontal planes and the cart 10 is completely unfolded.

In the final step, the two components 26,27 of each of the side and end members 15,16 of the upper and lower platforms 13,14 locked in end to end horizontal arrangement at the swivel hinges 28,29 and the friction hinges 30 are similarly locked into place to lock the platforms 13,14 at the vertical members 12. A downward force is applied to the lower swivel hinges 29 causing the side and end members 15,16 to overcome and pass by the friction means 45,61 at both the lower swivel hinges 29 and the lower friction hinges 30 and to lock therein.

Each of the two components 26,27 of the side and end members 15,16 of the upper platform 13 are grasped and pulled upwards, aligning the free end 35 of one member with the sleeve 33 attached to the other and permitting the tension spring 36 to pull the free end 35 into the sleeve 33 for positioning and locking the two components 26,27 in end to end substantially horizontal alignment therein. Further the upward force required to engage and lock the upper swivel hinges 28 also causes the side and end members 15,16 to overcome the friction means 61 in the upper friction hinges 30 at the vertical members 12, locking the side and end members 15,16 therein.

The cart 10 is now in the unfolded position and is ready for use.

The embodiments of the invention in which an exclusive property or privilege is claimed are defined as follows:

1. A portable folding shopping cart and utility carrier comprising:
    a foldable substantially rectangular frame having,
    four substantially vertical members;
    a substantially rectangular upper horizontal platform having end and side members, each of the end and side members comprising two components, the upper platform being hingedly connected to the vertical members adjacent a top end of the vertical members;
    a substantially rectangular lower horizontal platform having end and side members, each of the end and side members comprising two components, the lower platform being hingedly connected to the vertical members adjacent a lower end of the vertical members;
    wherein each of the end and side members of the upper and lower platforms are operatively connected between the two components so as to be foldable between a substantially aligned open position and a folded position;
    a flexible top basket, having a peripheral upper edge, closed ends, sides and a bottom and an open top, supported at the upper edge by the upper platform, the top basket being foldable into a space defined by the substantially rectangular frame in the folded position;
    a flexible lower shelf having a peripheral edge supported by the lower platform and being foldable in the space defined by the substantially rectangular frame in the folded position;
    a plurality of wheels connected to bottoms of the vertical members; and
    a tensile connector connected between a bottom of the top basket and a top of the lower shelf for supporting the top basket and lower shelf in spaced relationship in the open position, for retaining the top basket and the lower shelf within the space defined by the rectangular frame in the folded position and for assisting in folding the lower shelf when the top basket is in a folded position.

2. The cart of claim 1 wherein the tensile connector is a strap.

3. The cart of claim 1 wherein the upper platform further comprises:
    upper swivel hinges for hingedly connecting between the two components of each of the end members and side members,
    wherein the upper swivel hinges permit each of the end and side members of the upper platform to fold downwards between the two components.

4. The cart of claim 3 wherein the upper swivel hinges comprise:
    a short sleeve fixedly connected to an inner end of one of the two components of each end and side member of the upper platform, an inner end of the second of the two components being removeably fit within the sleeve; and
    a tensile member connecting between the inner ends of the two components and attached at opposing ends to adjacent vertical members, the tensile member acting, in the open position, to bias the inner ends of the two components together, the two components being arranged substantially horizontally, wherein the inner end of the second of the two components is removable from the sleeve when the tensile member is overcome so as to permit folding of the end and side members of the upper platform.

5. The cart of claim 4 wherein the tensile member is a spring.

6. The cart of claim 4 wherein the tensile member is a spring connected to a chain, the spring being connected to one vertical member and the chain being connected to the adjacent vertical member, the spring and chain passing through the bores of the two components.

7. The cart of claim 1 wherein the lower platform further comprises:

lower swivel hinges for hingedly connecting between the two components of each of the end members and side members, wherein the lower swivel hinges permit each of the end and side members of the lower platform to fold upwards between the two components.

8. The cart of claim 7 wherein the lower swivel hinge comprises:

a substantially inverted and U-shaped saddle having open ends for accepting inner ends of the two components of each of the end and side members therein;

fasteners for pivotally connecting the inner ends to the saddle to permit movement between an open position wherein inner ends are substantially horizontal to and within the saddle and a folded position wherein each of the inner ends is within and substantially perpendicular to the saddle;

an opening formed in a top of the saddle for accommodating the inner ends of the two components of each of the end and side members when pivoted to the folded position; and friction means formed on an inner surface of the saddle for locking the inner ends in the saddle in the open position.

9. The cart of claim 8 wherein the fasteners are pins.

10. The cart of claim 8 wherein the friction means within the upper and lower friction hinges are protrusions.

11. The cart of claim 1 further comprising upper and lower friction hinges for hingedly connecting the end and side members of the upper platform and of the lower platform to the vertical members, the friction hinges having friction means therein for retaining the end and side members within the friction hinges in the open position, wherein the end and side members are operable to overcome the friction means in the friction hinges to permit the upper platform to fold downwards and the lower platform to fold upwards.

12. The cart of claim 11 wherein the upper and lower friction hinges comprise:

a substantially U-shaped saddle having open ends for accepting outer ends of the each of the two components of each of the side and end members therein;

fasteners for pivotally connecting the outer ends to the saddle to permit movement of the side and end members between a substantially horizontal open position and a folded position;

an opening formed in a top of the saddle for accommodating one of the vertical members to which one of each of the upper and lower friction hinges is attached and the outer ends of each of the two components of each of the side and end members when pivoted to the folded position; and friction means formed on an inner surface of the saddle for locking the outer ends in the saddle in the open position.

13. The cart of claim 12 wherein the fasteners are pins.

14. The cart of claim 12 wherein the friction means within the upper and lower friction hinges are protrusions.

15. The cart of claim 11 further comprising:

one or more elongate flaps formed along at least a portion of the peripheral edge of the top basket, the elongate flaps being foldable over the end and side members of the upper platform without restricting the hinged connections of the upper platform; and fasteners positioned in the one or more elongate flaps so as to permit fastening of the top basket to the end and side members of the upper platform.

16. The cart of claim 15 wherein the fasteners are co-operating male and female snap fasteners.

17. The cart of claim 1 further comprising:

one or more elongate flaps formed on a peripheral edge of ends and sides of the lower shelf, the flaps being foldable over the end and side members of the lower platform without restricting the hinged connections of the lower platform; and fasteners positioned in the one or more elongate flaps so as to permit fastening of the lower shelf to the end and side members of the lower platform.

18. The cart of claim 17 wherein the fasteners are co-operating male and female snap fasteners.

19. The cart of claim 1 further comprising a strap for wrapping about the vertical members in the folded position for restraining the vertical members in the folded position.

20. The cart of claim 1 further comprising:

one or more elongate sleeves formed along at least a portion of the peripheral edge of the top basket and positioned spaced from the hinged connections of the upper platforms, wherein the side and end members of the upper platform are fit within the sleeves for supporting the top basket thereon.

21. The cart of claim 1 further comprising:

one or more elongate sleeves formed on a peripheral edge of ends and sides of the lower shelf and being positioned spaced from the hinged connections of the lower platform, wherein the side and end members of the lower platform are fit within the sleeves for supporting the lower shelf thereon.

* * * * *